US 9,922,441 B2
Mar. 20, 2018

(12) United States Patent
Kobayashi et al.

(54) IMAGE PROCESSING DEVICE, IMAGE PROCESSING METHOD, AND PROGRAM

(75) Inventors: Seiji Kobayashi, Tokyo (JP); Toshio Yamazaki, Tokyo (JP)

(73) Assignee: Saturn Licensing LLC, New York, NY (US)

(*) Notice: Subject to any disclaimer, the term of this patent is extended or adjusted under 35 U.S.C. 154(b) by 608 days.

(21) Appl. No.: 13/990,824

(22) PCT Filed: Oct. 24, 2011

(86) PCT No.: PCT/JP2011/074469
§ 371 (c)(1),
(2), (4) Date: May 31, 2013

(87) PCT Pub. No.: WO2012/077420
PCT Pub. Date: Jun. 14, 2012

(65) Prior Publication Data
US 2013/0249904 A1    Sep. 26, 2013

(30) Foreign Application Priority Data

Dec. 9, 2010 (JP) ................................ P2010-274808
Mar. 22, 2011 (JP) ................................ P2011-062228

(51) Int. Cl.
*G06T 15/00*   (2011.01)
*H04N 13/00*   (2018.01)
(Continued)

(52) U.S. Cl.
CPC ......... *G06T 15/00* (2013.01); *H04N 13/0014* (2013.01); *H04N 13/026* (2013.01);
(Continued)

(58) Field of Classification Search
None
See application file for complete search history.

(56) References Cited

U.S. PATENT DOCUMENTS 5,717,415 A * 2/1998 Iue .................... H04N 13/0051
345/419
5,926,190 A * 7/1999 Turkowski ............ G06T 7/0028
345/473
(Continued)

FOREIGN PATENT DOCUMENTS

CN          101646095 A      2/2010
EP        19970305967    *   6/1997
(Continued)

OTHER PUBLICATIONS

Rhee et al. (Stereoscopic View Synthesis by View Morphing, ISVC 2008, Part II, p. 924-933, Springer-Verlag Berlin Heidelberg).*
(Continued)

*Primary Examiner* — Kyle Zhai
(74) *Attorney, Agent, or Firm* — Oblon, McClelland, Maier & Neustadt, L.L.P.

(57) ABSTRACT

An image processing device with a configuration enabling generating of images from a new viewpoint by simple signal processing is provided. Input image signals for the right eye, and input image signals for the left eye to be applied to image display are input, and a right image converting unit generates a converted image where the input image signals for the right eye have been subjected to phase change in the right direction or the left direction, in accordance with features of the image. In the same way, a left image converting unit generates a converted image where the input image signals for the left eye have been subjected to phase change in the left direction or the right direction, in accordance with features of the image. The generated image of the right image converting unit and the generated image of the left image converting unit are output as multiple new viewpoint images. A converted image is generated by processing where a luminance differential signal of an input (Continued)

image, or a nonlinear conversion signal of the luminance differential signal is added or subtracted, to or from the input image signal, for example.

9 Claims, 22 Drawing Sheets

(51) Int. Cl.
 *H04N 13/04* (2006.01)
 *H04N 13/02* (2006.01)
(52) U.S. Cl.
 CPC ..... *H04N 13/0402* (2013.01); *H04N 13/0447* (2013.01); *H04N 13/0239* (2013.01); *H04N 2013/0081* (2013.01)

(56) References Cited

U.S. PATENT DOCUMENTS

| | | | | |
|---|---|---|---|---|
| 2001/0052935 | A1* | 12/2001 | Yano | G06T 7/0075 348/207.99 |
| 2002/0024592 | A1 | 2/2002 | Uomori et al. | |
| 2004/0125044 | A1* | 7/2004 | Suzuki | G06F 3/011 345/1.1 |
| 2004/0190023 | A1* | 9/2004 | Aoyama | H04N 1/58 358/1.9 |
| 2009/0079818 | A1* | 3/2009 | Saishu | G03B 35/00 348/51 |
| 2009/0295790 | A1* | 12/2009 | Pockett | G03B 35/08 345/419 |
| 2010/0033554 | A1 | 2/2010 | Kobayashi | |
| 2010/0060719 | A1* | 3/2010 | Watanabe | H04N 13/0011 348/47 |
| 2011/0129144 | A1* | 6/2011 | Takahashi | G06T 5/008 382/154 |
| 2012/0019634 | A1* | 1/2012 | Jian | H04N 13/0011 348/54 |
| 2012/0069143 | A1* | 3/2012 | Chu | H04N 13/0022 348/43 |

FOREIGN PATENT DOCUMENTS

| | | |
|---|---|---|
| EP | 0 896 301 A | 2/1999 |
| EP | 1 313 329 | 5/2003 |
| EP | 2 152 011 | 2/2010 |
| JP | 09-322199 | 12/1997 |
| JP | 10-032840 | 2/1998 |
| JP | 2001-346226 | 12/2001 |
| JP | 2006-115198 | 4/2006 |
| JP | 2009-124308 | 6/2009 |
| JP | 2010-063083 | 3/2010 |
| WO | WO 2010-085361 | 7/2010 |
| WO | WO 2010-136921 | 12/2010 |
| WO | WO 2011-099314 | 8/2011 |
| WO | WO 2011/099314 | 8/2011 |

OTHER PUBLICATIONS

Notification of the First Office Action dated Jan. 28, 2015 from the State Intellectual Property Office of People's Republic of China from Application No. 201180058061.8.
International Search Report in Application No. PCT/JP2011/074469 dated Jan. 17, 2012. 2 pages.
English-language Extended European Search Report in counterpart European Application No. EP 11 84 7769, dated Apr. 16, 2015.
Dmitiriy Vatolin, et al., "MSU Stereo To Multiview 3D Video Conversion—content creation technology for glasses-free 3D displays", Compression Project Video 3D Display, Web Archive, pp. 1-7.
Office Action dated Jun. 21, 2017 in Canadian Patent Application No. 2,812,903.

* cited by examiner

IMAGE PROCESSING DEVICE, IMAGE PROCESSING METHOD, AND PROGRAM

TECHNICAL FIELD

The present disclosure relates to an image processing device, an image processing method, and a program, and particularly relates to an image processing device, an image processing method, and a program whereby image conversion is performed on two-dimensional images to generate multi-viewpoint images capable of being used as 3D images, for example.

BACKGROUND ART

With 3D televisions where a user can perceive stereoscopic images, naked-eye 3D television where the user can view stereoscopic images without wearing glasses has started to come into practical use. With naked-eye 3D television, the display face has, for example, lenticular sheets or parallax barriers (disparity barriers), so as to control images entering the left eye and the right eye by the viewing position. That is to say, the configuration is such that left eye images and right eye images are generated, with the left eye images being observed with the left eye alone, and right eye images being observed with the right eye alone.

By using such technology, crosstalk where images entering the left eye and right eye become mixed is suppressed, and stereoscopy is enabled even without wearing glasses.

However, with such methods, correct stereoscopy can only be obtained at a restricted viewing position as to the display. Accordingly, in the event that the observation position of the user is a different position from the stipulated position, pseudoscopy, where the right eye image enters the left eye and the left eye image enters the right eye, or crosstalk, where the right eye image and left eye image become mixed, occur.

To solve this problem, there has been proposed a configuration in which, in addition to the left eye image and right eye image corresponding to the one normal observation point, an image is generated from a new viewpoint of a setting where crosstalk does not occur when viewed from another observation position. That is to say, image display with suppressed pseudoscopy and crosstalk is performed with the left eye image and right eye image corresponding to various observation positions of the user being selectable in accordance with the observation position of the user.

Specifically, based on images of two viewpoints that are originally input to the display device, i.e., on the two viewpoint images of the left eye image and the right eye image, viewpoint images other than these two viewpoint images are further generated. Two optimal images corresponding to the user observation position can be matched from the original left eye image and right eye image, and further the generated artificial viewpoint images, in accordance with the observation position of the user as to the display, and displayed, whereby display and observation with suppressed crosstalk where the right eye image and left eye image become mixed is enabled.

A specific example of processing will be described with reference to the drawings.

FIG. 1 represents an image obtained in a case of shooting subjects A and B from two different viewpoints. As illustrated in the drawing, a left image 21 shot with a left camera 11 and a right image 22 shot with a right camera 12 differ with regard to the position of the subjects, in accordance with the distance from the cameras, with the subject B being hidden behind the image of subject A more in the right image 22 than in the left image 21.

FIG. 2 represent an image obtained in a case of shooting subjects from four different viewpoints (viewpoint 1 through 4). The subjects A and B are shot from the four cameras of viewpoint 1 camera 31, viewpoint 2 camera 32, viewpoint 3 camera 33, and viewpoint 4 camera 34.

The image shot by viewpoint 1 camera 31 is viewpoint 1 image 41, the image shot by viewpoint 2 camera 32 is viewpoint 2 image 42, the image shot by viewpoint 3 camera 33 is viewpoint 3 image 43, and the image shot by viewpoint 4 camera 34 is viewpoint 4 image 44.

As illustrated in the drawing, change in the positions of the subjects increases among the images of viewpoints 1 through 4 as the number of viewpoints increases and the distance between cameras increases.

In the event that the inputs image to the image processing device performing 3D image display are only the two images corresponding to the viewpoint 2 and viewpoint 3, a multi-viewpoint image generating unit of the image processing device generates the viewpoint 1 image 41 based on the viewpoint 2 image 42 for example and artificially generates the viewpoint 4 image 44 using the viewpoint 3 image 43.

However, there exists in the viewpoint 1 image 41 a region not included in the viewpoint 2 image 42 (the region of the subject B that was hidden behind the subject A), and the multi-viewpoint image generating unit needs to interpolate this region by image processing. In the same way, there exists in the viewpoint 4 image 44 a region not included in the viewpoint 3 image 43 (the background region that was hidden behind the subject A), and this region needs to be interpolated by image processing. Normally, such a region is called an occlusion region.

Conventionally, with multi-viewpoint generating technology where two or more viewpoint images as used to generate an even greater number of viewpoint images, there has been proposed a technology in which image depth information having subject distance information, for each pixel or in increments of blocks, is generated from the input images, and different viewpoint images are generated based on depth information obtained from the image depth information.

With conventional techniques, the position of a subject obtained from the depth information is converted into a position on an image obtained from a different viewpoint position to be newly generated, thereby projecting the subject, and generating a new viewpoint image.

With such a technique, images can be generated from any viewpoint, but the image quality of new viewpoint images affects precision of depth information. Accordingly, depth detection processing is necessary to generate high-precision image depth information, and accordingly there has been a problem that the circuit scale becomes great.

Also, as described above, in the event that there is an occlusion region equivalent to a region that was hidden in the actually shot image, there are cases where image information, necessary for the viewpoint image to be newly generated, cannot be obtained from the pixel images. As a result, there is a problem that setting of the pixel values of the viewpoint image to be newly generated cannot be made, resulting in a hole in the image. Image interpolation technology is necessary to solve this problem, and there has been the problem that the necessity for a circuit for this interpolation processing also leads to increased circuit scale.

SUMMARY OF INVENTION

Technical Problem

As described above, in order to generate, based on a shot image, an artificial shot image from another viewpoint, depth detection processing circuits for obtaining high-precision depth information, and image interpolation processing circuits for occlusion regions, are necessary, which are contributing factors to increased size and increased costs of the device.

The present disclosure provides an image processing device, an image processing method, and a program, whereby for example the above problems are solved, and based on a shot image, an artificial shot image can be generated from another viewpoint, with depth detection processing and processing on occlusion regions being rendered unnecessary or simplified.

Solution to Problem

A first aspect of the present disclosure is an image processing device including:

a right image input unit configured to input image signals for the right eye, to be applied to 3-dimensional image display;

a left image input unit configured to input image signals for the left eye, to be applied to 3-dimensional image display;

a right image converting unit configured to generate a converted image where the input image signals for the right eye have been subjected to phase change in the right direction or the left direction, in accordance with features of the image;

a left image converting unit configured to generate a converted image where the input image signals for the left eye have been subjected to phase change in the left direction or the right direction, in accordance with features of the image; and an image output unit configured to output a generated image of the right image converting unit and a generated image of the left image converting unit as a plurality of new viewpoint images.

Further, according to an embodiment of the image processing device according to the present disclosure, further included is: a depth detecting unit configured to generate image depth information having subject distance information corresponding to image signals from each of the input image signals for the right eye and the input image signals for the left eye; wherein the left image converting unit and right image converting unit generate a converted image where the image signals have been subjected to phase change in the left direction or the right direction, with the image depth information as auxiliary information.

Further, according to an embodiment of the image processing device according to the present disclosure, further included is: a depth estimating unit configured to generate subject distance estimation information to image signals from each of the input image signals for the right eye and the input image signals for the left eye; wherein the left image converting unit and right image converting unit generate a converted image where the image signals have been subjected to phase change in the left direction or the right direction, with the subject depth estimation information as auxiliary information.

Further, according to an embodiment of the image processing device according to the present disclosure, the left image converting unit and right image converting unit extract a luminance differential signal of an input image signal, sets the luminance differential signal as a feature amount, and generates a converted image by adding or subtracting, to or from the input image signal, the luminance differential signal which is the feature amount, or a nonlinear conversion signal of the luminance differential signal.

Further, according to an embodiment of the image processing device according to the present disclosure, the left image converting unit or right image converting unit includes a multi-stage connecting configuration; with a converted image generated by an upstream image converting unit being input to a downstream image converting unit, with processing of subjecting input image signals to phase change being repeatedly executed at each image converting unit, sequentially generating new converted images at each image converting unit.

Further, according to an embodiment of the image processing device according to the present disclosure, the left image converting unit and right image converting unit calculate an inter-image distance difference between maximum distance and minimum distance subjects, from depth information calculated or estimated based on input image signals for the right eye and input image signals for the left eye; and generate a new viewpoint image with inter-image distance difference between the maximum distance and minimum distance subjects, obtained from the new viewpoint image and another image, controlled, in accordance with the inter-image distance difference.

Further, according to an embodiment of the image processing device according to the present disclosure, the left image converting unit and right image converting unit calculate an inter-image distance difference between maximum distance and minimum distance subjects, from depth information calculated or estimated based on input image signals for the right eye and input image signals for the left eye; and generate a new viewpoint image with the inter-image distance differences between the viewpoint images distributed approximately uniformly, in accordance with the number of viewpoint images to be output ultimately.

Further, a second aspect of the present disclosure is an image processing method to be executed at an image processing device, the method including:

a right image input step for a right image input unit to input image signals for the right eye, to be applied to 3-dimensional image display;

a left image input step for a left image input unit to input image signals for the left eye, to be applied to 3-dimensional image display;

a right image converting step for a right image converting unit to generate a converted image where the input image signals for the right eye have been subjected to phase change in the right direction or the left direction, in accordance with features of the image;

a left image converting step for a left image converting unit to generate a converted image where the input image signals for the left eye have been subjected to phase change in the left direction or the right direction, in accordance with features of the image; and and image output step for an image output unit to output a generated image of the right image converting unit and a generated image of the left image converting unit as a plurality of new viewpoint images.

Further, a third aspect of the present disclosure is a program causing an image processing device to execute image processing including:

a right image input step for a right image input unit to input image signals for the right eye, to be applied to 3-dimensional image display;

a left image input step for a left image input unit to input image signals for the left eye, to be applied to 3-dimensional image display;

a right image converting step for a right image converting unit to generate a converted image where the input image signals for the right eye have been subjected to phase change in the right direction or the left direction, in accordance with features of the image;

a left image converting step for a left image converting unit to generate a converted image where the input image signals for the left eye have been subjected to phase change in the left direction or the right direction, in accordance with features of the image; and and image output step for an image output unit to output a generated image of the right image converting unit and a generated image of the left image converting unit as a plurality of new viewpoint images.

Note that the program according to the present disclosure is, for example, a program which can be provided to a general-purpose system capable of executing various types of program code, in a computer-readable format by storage medium and communication medium. Providing such a program in a computer-readable format realizes processing on the computer system corresponding to the program.

Further objects, features and advantages of the present disclosure will become apparent from later-described embodiments of the present disclosure and detailed description with reference to the attached drawings. Note that system as used in the present specification is a logical group configuration of multiple devices, and is not restricted to the devices of each configuration being within the same housing.

Advantageous Effects of Invention

According to an embodiment configuration of the present disclosure, an image processing device which generates images from a new viewpoint is realized by simple signal processing. Specifically, for example, image signals for the right eye, and image signals for the left eye to be applied to image display are input, and a right image converting unit generates a converted image where the input image signals for the right eye have been subjected to phase change in the right direction or the left direction, in accordance with features of the image. In the same way, a left image converting unit generates a converted image where the input image signals for the left eye have been subjected to phase change in the left direction or the right direction, in accordance with features of the image. The generated image of the right image converting unit and the generated image of the left image converting unit are output as multiple new viewpoint images. A converted image is generated by processing where a luminance differential signal of an input image, or a nonlinear conversion signal of the luminance differential signal is added or subtracted, to or from the input image signal, for example. By these processing, generating of images from various viewpoints is enabled without using high-precision subject distance information.

DESCRIPTION OF EMBODIMENTS

Figure 1:
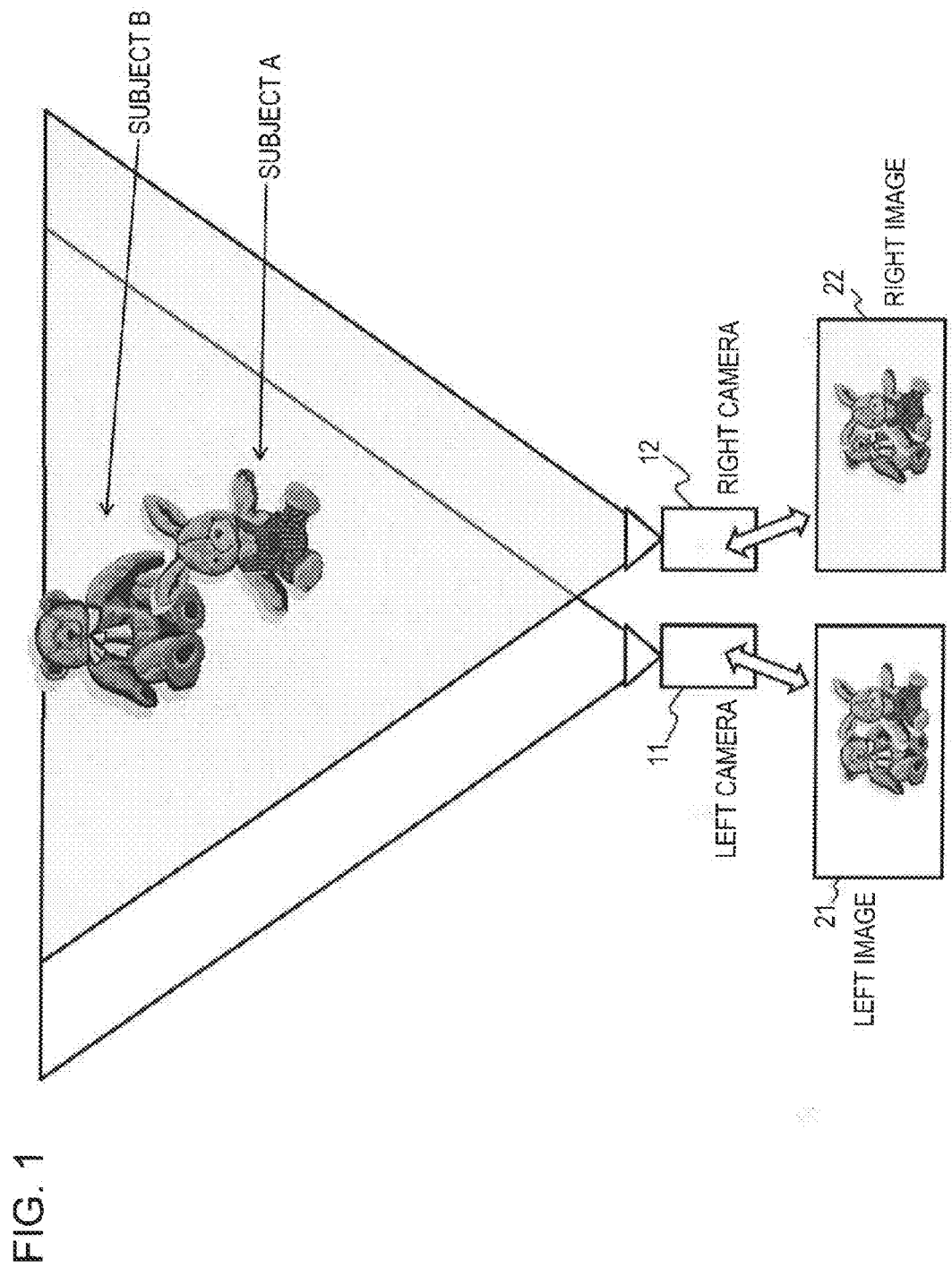
FIG. 1 is a diagram for describing an example of images obtained in a case of shooting subjects A and B from two different viewpoints.
Figure 2:
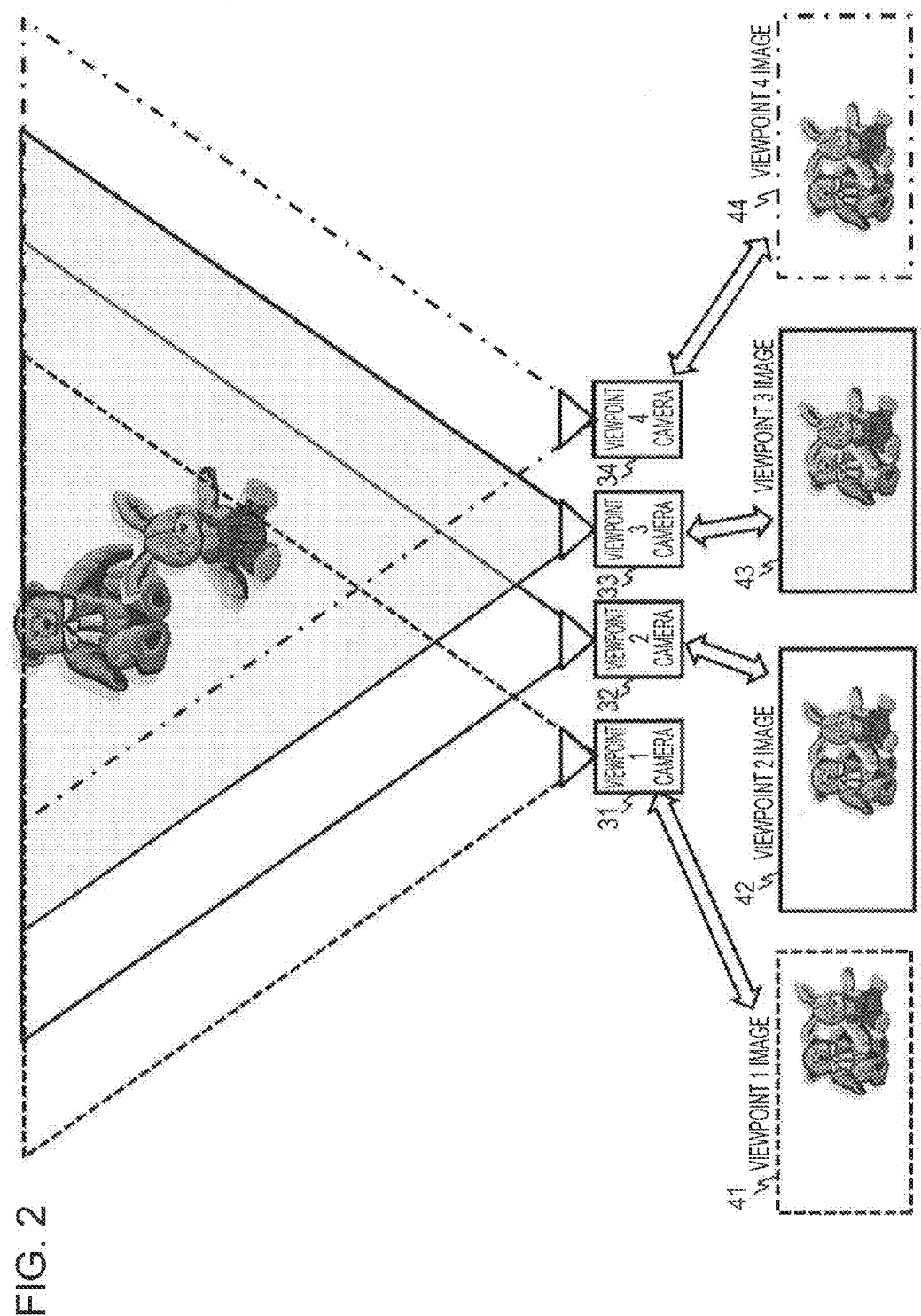
FIG. 2 is a diagram for describing an example of images obtained in a case of shooting subjects from four different viewpoints (viewpoints 1 through 4).

The image processing device, image processing method, and program, according to the present disclosure, will now be described in detail with reference to the drawings. Description will proceed in accordance with the following items.
1. Overview of Processing Executed by Image Processing Device According to Present Disclosure
2. About First Embodiment of Image Processing Device
3. About Second Embodiment of Image Processing Device
4. About Third Embodiment of Image Processing Device
5. About Fourth Embodiment of Image Processing Device
6. About Fifth Embodiment of Image Processing Device
7. About Sixth Embodiment of Image Processing Device
8. About Seventh Embodiment of Image Processing Device
9. About Eighth Embodiment of Image Processing Device
10. About Ninth Embodiment of Image Processing Device
11. Review of Configuration of Present Disclosure
1. Overview of Processing Executed by Image Processing Device According to Present Disclosure First, an overview of processing which the image processing device according to the present disclosure executes will be described.

The image processing device according to the present disclosure inputs images shot from two or more different viewpoints, including a left image for the left eye and a right eye image for the right eye, to be applied to 3D image display for example, and uses these input images to generate an image equivalent to a shot image from a viewpoint different from the viewpoints of the input images, and outputs this.

With the image processing device according to the present disclosure, processing to generate, from one two-dimensional image (2D image), an image equivalent to a shot image form a different viewpoint from that of the two-dimensional image. Note that for this processing, the processing disclosed in Japanese Unexamined Patent Application Publication No. 2010-63083, which is a previous application of the Present Applicant, may be applied. Note that the processing of generating, based on a two-dimensional image, an image of a different viewpoint, will be referred to as 2D3D conversion processing in the Present Specification.

Note that the 2D3D conversion processing disclosed in Japanese Unexamined Patent Application Publication No. 2010-63083 is processing to generate a binocular disparity image corresponding to stereoscopy (stereoscopy) based on one two-dimensional image. Spatial feature amounts included in the two-dimensional image, such as luminance information for example, is extracted, and conversion processing of the input image is performed using the extracted feature amount to generate a left eye image and right eye image.

The image processing device according to the present disclosure applies this 2D3D conversion processing for example, to generate, based on input images, images of viewpoints different from the input images.

Specifically, based on a left image for the left eye for 3D image display, which is the input image for example, an image equivalent to an image shot from a viewpoint further to the left side, is generated.

In the same way, based on a right image for the right eye for 3D image display, which is the input image for example, an image equivalent to an image shot from a viewpoint further to the right side, is generated.

According to such processing, images corresponding to shot images from various viewpoints different from the input image are generated, and a multi-viewpoint image of viewpoints other than those of the input image is generated.

Figure 3:
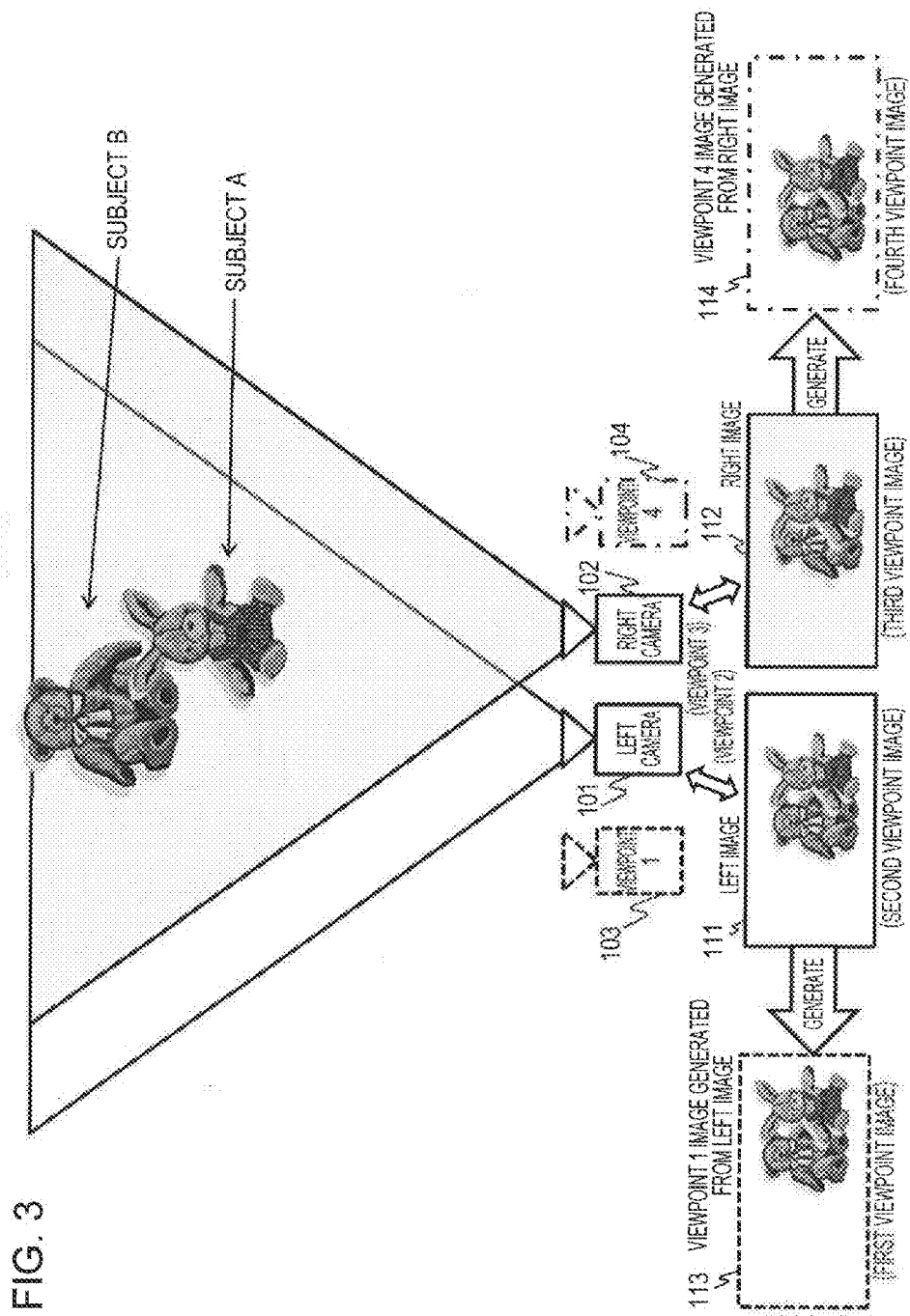
FIG. 3 is a diagram for describing an example of generating processing of multi-viewpoint images generated by the method of the present disclosure.

FIG. 3 is a diagram illustrating an example of multi-viewpoint image generating processing generated by the method according to the present disclosure.

In the same way as described earlier with reference to FIG. 1, the two images shot for 2D image display, i.e., (1) a left image 111 shot by a left camera 101, and
(2) a right image 112 shot by a right camera 102;

these images are input to the image processing device according to the present disclosure.

The image processing device according to the present disclosure uses these shot images to, for example, generate a viewpoint 1 image 113 equivalent to a shot image from a viewpoint 1, 103 further to the left from that of the left camera 101, by 2D3D conversion processing using the left image 111.

Also, to generate a viewpoint 4 image 114 equivalent to a shot image from a viewpoint 4, 104 further to the right from that of the right camera 102, by 2D3D conversion processing using the right image 112.

Note that the example illustrated in FIG. 3 is an example of processing which the image processing device according to the present disclosure executes. The image processing device according to the present disclosure enables, based on one two-dimensional image, generating of an image from various viewpoints different from that image, by the above-described 2D3D conversion processing.

[2. About First Embodiment of Image Processing Device]

Figure 4:
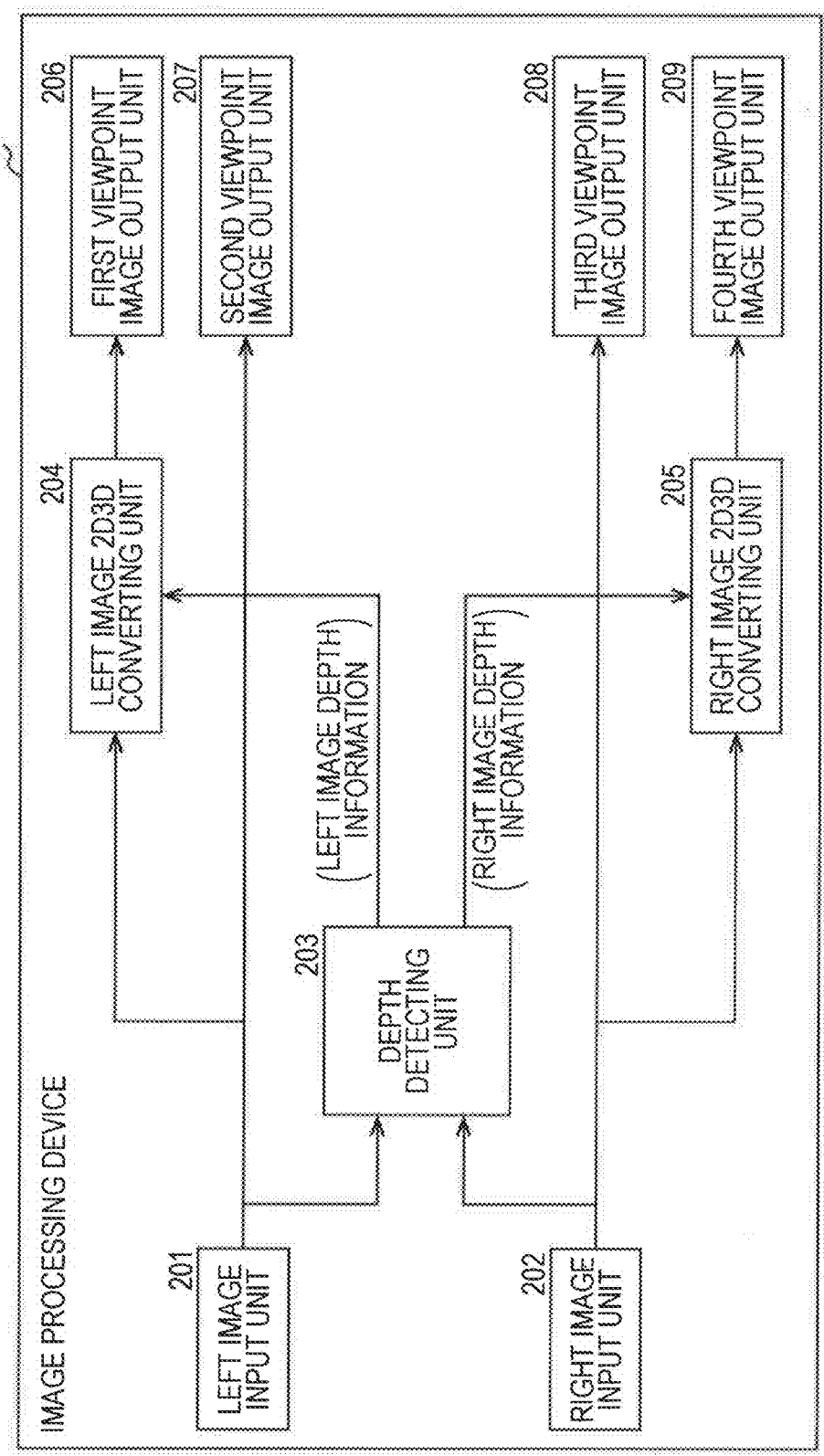
FIG. 4 is a diagram for describing a configuration example of an image processing device according to a first embodiment of the present disclosure.

FIG. 4 is a configuration diagram of a first embodiment of the image processing device according to the present disclosure.

The first embodiment is a device which takes two different viewpoints left and right (left image, right image), and performs multi-viewpoint image generating where images of four viewpoints of a first through a fourth are output.

The input image is a combination of a left eye image (left image) and a right eye image (right image) to be applied to 3D image display. For example, the left image 111 (second viewpoint image) shot with the left camera 101 in the example in FIG. 3, and the right image 112 shot with the right camera 102.

The image processing device 200 illustrated in FIG. 4 outputs the input left image as it is as a second viewpoint image.

A first viewpoint image which is a shot image from a viewpoint further to the left of the left image is generated by 2D3D conversion processing based on the input left image (second viewpoint image).

Further, the input right image is output as it is as a third viewpoint image.

A fourth viewpoint image which is a shot image from a viewpoint further to the right of the right image is generated by 2D3D conversion processing based on the input right image (third viewpoint image).

Processing executed with this image processing device according to the configuration of the image processing device 200 illustrated in FIG. 4 will be described.

A left image input unit 201 inputs a left image (second viewpoint image). The input left image (second viewpoint image) is input to a depth detecting unit 203 and a left image 2D3D converting unit 204.

In the same way, a right image input unit 202 inputs a right image (third viewpoint image). The input right image (third viewpoint image) is input to the depth detecting unit 203 and a right image 2D3D converting unit 205.

The depth detecting unit 203 detects which of the pixels or blocks in the right image that the pixels or blocks in the left image correspond to, and left image depth information where the difference in position is saved at a position corresponding to that pixel in the left image, and detects which of the pixels or blocks in the left image that the pixels or blocks in the right image correspond to, and generates right image depth information where the difference in position is saved at a position corresponding to that pixel in the right image.

That is to say, depth information (distance information from the camera) is calculated in block increments or pixel increments, based on positional shift of corresponding pixels, based on, for example, conventionally-known block matching or the like, and depth information having distance data corresponding to pixels or blocks (e.g., a distance image) is generated.

The right image input unit 202 generates left image depth information (e.g., a distance image) corresponding to the left image, and provides this to the left image 2D3D converting unit 204. Further, right image depth information (e.g., a distance image) corresponding to the right image is generated, and provided to the right image 2D3D converting unit 205.

The left image 2D3D converting unit 204 inputs the left image (second viewpoint image) input from the left image input unit 201 and the left image depth information (e.g., a distance image) generated at the depth detecting unit 203, and using this information, generates a first viewpoint image equivalent to a shot image from a viewpoint further to the left side from the input left image (second viewpoint image).

In the same way, the right image 2D3D converting unit 205 inputs the right image (third viewpoint image) input from the right image input unit 202 and the right image depth information (e.g., a distance image) generated at the depth detecting unit 203, and using this information, generates a fourth viewpoint image equivalent to a shot image from a viewpoint further to the right side from the input right image (third viewpoint image).

The first viewpoint image which the left image 2D3D converting unit 204 has generated is output via a first viewpoint image output unit 206.

The left image which the left image input unit 201 has input, i.e., the second viewpoint image, is output via a second viewpoint image output unit 207.

The right image which the right image input unit 202 has input, i.e., the third viewpoint image, is output via a third viewpoint image output unit 208.

The fourth viewpoint image which the right image 2D3D converting unit 205 has generated is output via a fourth viewpoint image output unit 209.

Note that the output destination of the images is, for example, a device executing display processing of 3D image display, or a storage device recording 3D image data, or the like. Alternatively, this may be output as communication data as to a device connected via a network.

At the time of executing 3D image display at a display device for example, two images are appropriately selected in accordance with the observation position of the user, and output as a left eye image and right eye image.

For example, in the event that the observation position of the user is a standard position in front of the display unit,
the second viewpoint image is output as the left eye image, and the third viewpoint image is output as the right eye image.

Also, in the event the observation position of the user is a position to the left side of the front of the display unit,
the first viewpoint image is output as the left eye image, and the second viewpoint image is output as the right eye image.

Also, in the event that the observation position of the user is a position to the right side of the front of the display unit,
the third viewpoint image is output as the left eye image, and the fourth viewpoint image is output as the right eye image.

By performing such switching, a left eye image and right eye image optimal for the observation position of the user can be output.

Due to this processing, with a naked-eye 3D display device, e.g., a display device having, for example, lenticular sheets or parallax barriers (disparity barriers) on the display face, of a configuration, so as to control images entering the left eye and the right eye by the viewing position. That is to say, 3D image presentation is enabled where occurrence of pseudoscopy or crosstalk, where the right eye image enters the left eye and the left eye image enters the right eye, or the right eye image and left eye image become mixed, is suppressed.

With the image display device 200 illustrated in this FIG. 4, the left image 2D3D converting unit 204 inputs the left image (second viewpoint image) input from the left image input, unit 201 and the left image depth information (e.g., a distance image) generated at the depth detecting unit 203, and using this information, generates a first viewpoint image equivalent to a shot image from a viewpoint further to the left side from the input left image (second viewpoint image).

Also, the right image 2D3D converting unit 205 inputs the right image (third viewpoint image) input from the right image input unit 202 and the right image depth information (e.g., a distance image) generated at the depth detecting unit 203, and using this information, generates a fourth viewpoint image equivalent to a shot image from a viewpoint further to the right side from the input right image (third viewpoint image).

The left image 2D3D converting unit 204 and right image 2D3D converting unit 205 generate images of different viewpoints using one 2-dimensional image and depth information. Specifically, a shot image is generated from an artificial different viewpoint, by processing where a shift amount corresponding to depth information is set and the image is shifted to the left or right direction, i.e., processing where phase change is performed. A shot image of an artificial different viewpoint is generated by adjusting phase change amount (shift amount) and phase change direction (shift direction) to execute chase change processing (shift processing) in accordance with the depth information (distance from the camera) obtained in increments of pixels or blocks.

Accordingly, the spatial resolution of image depth information used at the 2D3D converting units does not necessarily have to be high, the left image depth information and right image depth information output from the depth detecting unit 203 can be made to be data of information amount smaller than the number of pixels of the input image, so the circuit scale of the depth detecting unit can be reduced.

Note that for the 2D3D conversion processing, processing described in aforementioned Japanese Unexamined Patent Application Publication No. 2010-63083, which is a previous application of the Present Applicant, can be applied. The 2D3D conversion processing described in aforementioned Japanese Unexamined Patent Application Publication No. 2010-63083 is processing where spatial feature amounts included in one 2-dimensional image, e.g., luminance information is extracted, and conversion processing of an input image is executed using the extracted feature amount, to generate a converted image equivalent to a shot image from a different viewpoint. Specifically, a luminance differential signal of an input image signal is extracted. The luminance differential signal is set as the feature amount, and a converted image is generated by adding or subtracting, to or from the input image signal, the luminance differential signal which is the feature amount, or a nonlinear conversion signal of the luminance differential signal. For example, this processing can be applied.

There are various proposals regarding processing to artificially generate an image of a difference viewpoint from a 2-dimensional image, not restricted to the method described in this Patent Literature, and the left image 2D3D converting unit 204 and right image 2D3D converting unit 205 generate an image of a difference viewpoint from the input image by applying one of these existing methods, for example.

A specific processing example of new viewpoint image generating processing which the left image 2D3D converting unit 204 and right image 2D3D converting unit 205 perform based on the depth information generated by the depth detecting unit 203 will be described with reference to FIG. 5.

Figure 5:
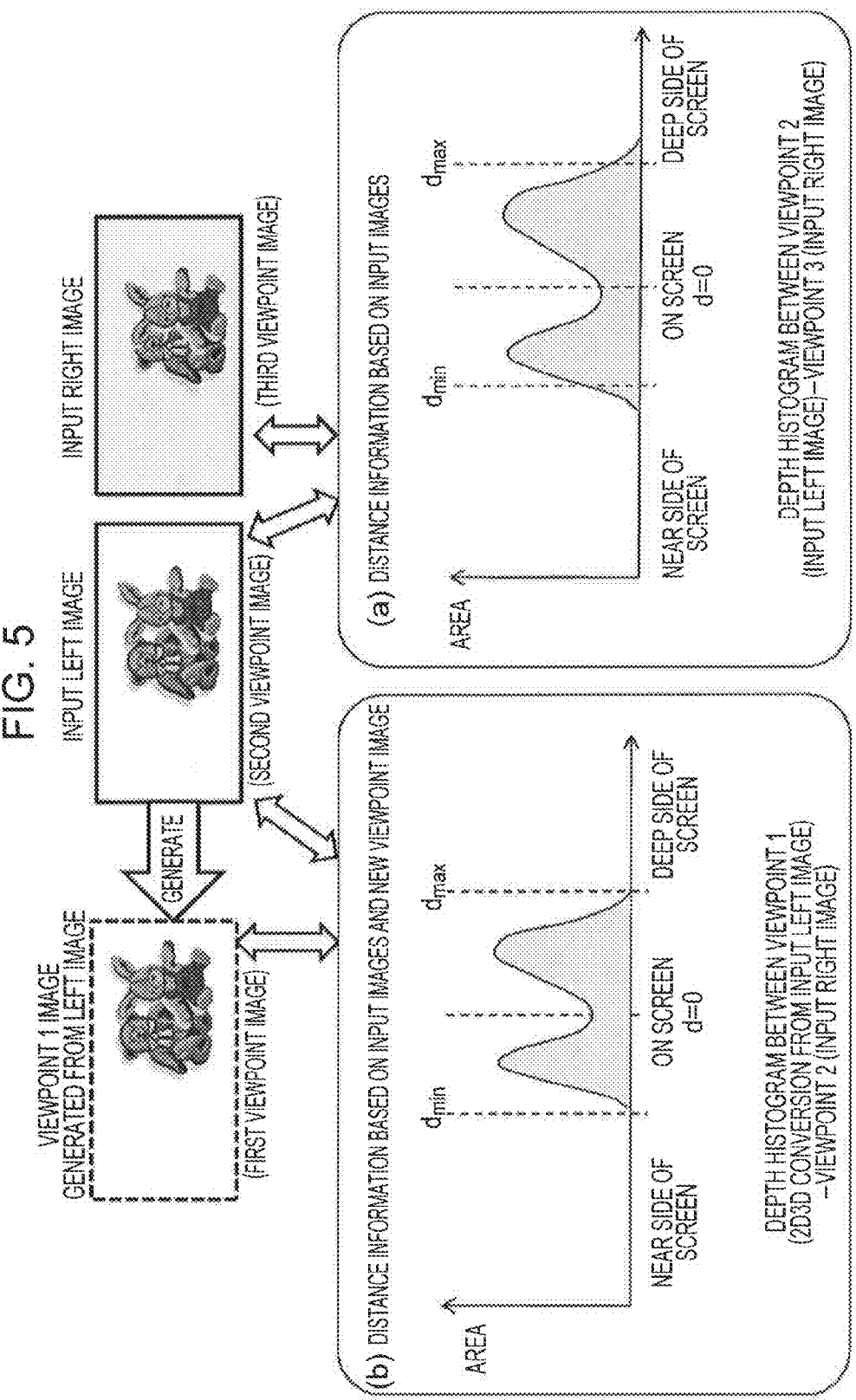
FIG. 5 is a diagram for describing a generating processing example of a new viewpoint image based on distance information.

FIG. 5 illustrates left and right input images in the embodiment illustrated in FIG. 4, and depth information between newly-generated viewpoint images.

The graph (a) shown at the lower right of FIG. 5 represents a histogram of depth information, detected between a left image input via the left image input unit 201 (equivalent to the second viewpoint image) and a right image input via the right image input unit 202 (equivalent to the third viewpoint image).

That is to say, this is depth information which the depth detecting unit 203 has detected.

Now, depth information is expressed as a distance d between the corresponding positions of the two images. That is to say, this is inter-pixel distance on the image of corresponding pixels in the left image and right image, detected by processing such as block matching and so forth.

With the histogram illustrated in FIG. 5(a), the horizontal axis represents the distance information d which changes in accordance with the distance to the subject, and the vertical axis represents the pixel area having each distance.

In the event that distance d=0, this is a state where the corresponding pixels in the left image and the right image have been detected at the same positions in the images, which is a so-called state with no disparity. An image of such pixel positions can be observed at the screen position of the display screen.

On the other hand, in the event that the distance d is smaller than 0 (the right image exists to the left side of the left image), a subject image is observed to the near side of the screen.

Also, in the event that the distance d is greater than 0 (the right image exists to the right side of the left image), a subject image is observed to the far side of the screen.

The left image 2D3D converting unit 204 and the right image 2D3D converting unit 205 first obtain the minimum value dmin and maximum value dmax of the distance d, from the histogram of depth information shown in FIG. 5(a), which is obtained from the generated information form the depth detecting unit 203.

Note that the values of the minimum value dmin and maximum value dmax of the histogram may be set several percent on the inner side from the actual maximum value and minimum value of the histogram, taking into consideration the effects of noise. FIG. 5(a) illustrates a line for the minimum value dmin and maximum value dmax several percent on the inner side from the actual measurement values.

The minimum value dmin thus obtained is a value corresponding to the depth of the subject situated at the forefront of the input image, and the maximum value dmax is a value corresponding to the depth of the subject situated at the deepest position of the input image.

In the embodiment illustrated in FIG. 4, the left image 2D3D converting unit 204 generates a first viewpoint image further to the left from the input left image (second viewpoint image), by 2D3D conversion processing from the input left image (second viewpoint image). For generating processing of this new viewpoint image, processing using depth information obtained from the left and right images illustrated in FIG. 5(a) is performed.

That is to say, the depth histogram obtained from the left and right images illustrated in FIG. 5(a) is a depth histogram of the input left image (second viewpoint image) and input right image (third viewpoint image).

The left image 2D3D converting unit 204 generates a first viewpoint image such that the depth histogram of the first viewpoint image to be newly generated and the input left image (second viewpoint image) is that illustrated in FIG. 5(a).

The graph shown in FIG. 5(b) is the depth histogram of the first viewpoint image to be newly generated and the input left image (second viewpoint image). The first viewpoint image is generated so as to correspond to this histogram.

The left image 2D3D converting unit 204 and right image 2D3D converting unit 205 generate a shot image from an artificial different viewpoint, by processing where a shift amount corresponding to depth information is set and the image is shifted to the left or right direction, i.e., processing where phase change is performed. An image of an artificial different viewpoint is generated by adjusting phase change amount (shift amount) and phase change direction (shift direction) to execute phase change processing (shift processing) in accordance with the depth information (distance from the camera) obtained in increments of pixels or blocks.

With this 2D3D conversion processing, shift amount is controlled based on depth information. Specifically, with the embodiment in FIG. 4, the left image 2D3D converting unit 204 adjusts the shift amount based on the depth information shown in FIG. 5(a), thereby generating a first viewpoint image where a sensation of depth equivalent to the sensation of depth obtained form the input left and right images, is obtained from the combination of the newly-generated first viewpoint image and the input left image (second viewpoint image).

Detailed shift processing will be described later.

In the same way, the right image 2D3D converting unit 205 adjusts the shift amount based on the depth information shown in FIG. 5(a), thereby generating a fourth viewpoint image where a sensation of depth equivalent to the sensation of depth obtained from the input left and right images, is obtained from the combination of the newly-generated fourth viewpoint image and the input right image (third viewpoint image).

FIG. 5(b) is a depth histogram of the first viewpoint image which the left image 2D3D converting unit 204 newly generates and the input left image (second viewpoint image).

While it is desirable that the depth between the newly-generated first viewpoint image and the input left image (second viewpoint image) be the same, 2D3D conversion processing is not always capable of generating disparity equivalent to the input depth information. The disparity amount generated by the 2D3D conversion processing is determined by gain settings controlling shift amount, and conversion filter properties, for example, so control is effected such that the maximum disparity does not exceed the disparity between input images, by controlling the gain control and conversion filter properties based on the depth information.

Accordingly, the image of viewpoint 1 generated by the 2D3D conversion processing is an image which has been generated as an image from a viewpoint further left from the input left image, by a shift amount that is the same as or smaller than the shift amount as to the input right image.

Regarding the fourth viewpoint image to be newly generated, as well, the right image 2D3D converting unit 205 also generates an image from a viewpoint further right from the input right image, by a shift amount that is the same as or smaller than the shift amount as to the input left image.

Thus, the 2D3D image converting units calculate inter-image distance between maximum distance and minimum distance subjects, from depth information calculated or estimated based on input image signals for the right eye and input image signals for the left eye, and generate a new viewpoint image in which the inter-image distance difference between the maximum distance and minimum distance subjects, obtained from a new viewpoint image and another image, has been controlled, in accordance with the inter-image distance difference.

Next, a detailed example of 2D3D conversion processing by controlling shift amount in accordance with distance information will be described.

Figure 6:
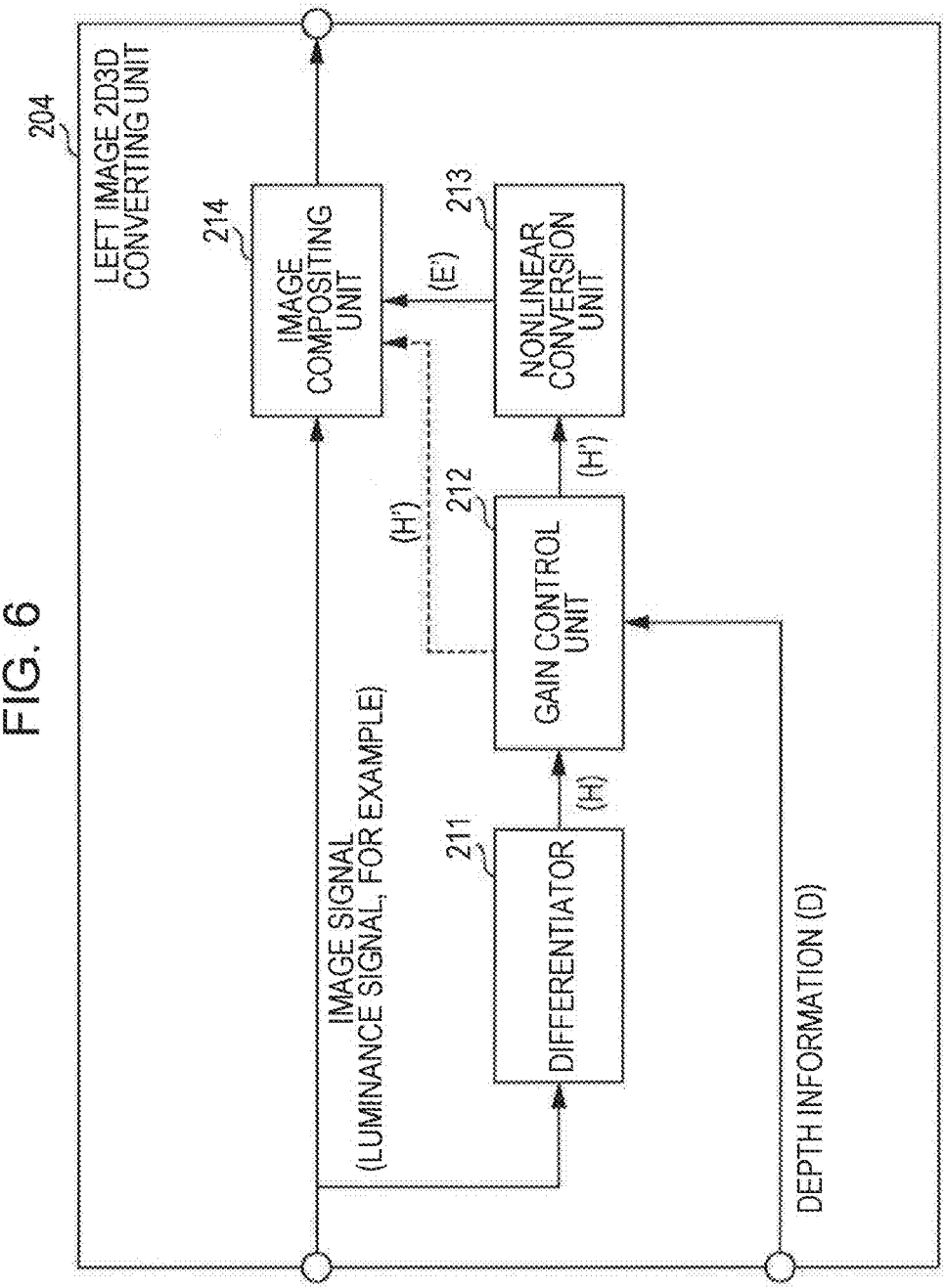
FIG. 6 is a diagram for describing a configuration example of a 2D3D image converting unit.

FIG. 6 is a block diagram illustrating the configuration of an embodiment of the left image 2D3D converting unit 204. Note that the left image 2D3D converting unit 204 and right image 2D3D converting unit 205 only change the shift direction in accordance with a newly-generated image. Hereinafter, a detailed example of 2D3D conversion processing by controlling shift amount in accordance with distance information will be described with the left image 2D3D converting unit 204 as a representative example.

The left image 2D3D converting unit 204 performs processing of extracting spatial feature amount of input image signals, and subjecting the extracted feature amount to different enhancement processing, thereby generating an image of a new viewpoint. The left image 2D3D converting unit 204 is configured of a differentiator 211, a gain control unit 211, a nonlinear conversion unit 213, and an image compositing unit 214.

The differentiator 211 extracts luminance signals from the video data input to the left image 2D3D converting unit 204, and generates differential signals (H) as to the luminance signals. Specifically, luminance signals of the image are input in the horizontal direction for example, and signals obtained by first derivation of the input luminance signals are generated. For first derivation, a horizontal-direction 3-tap linear first derivation filter or the like, for example, is used.

Note that, while description will be made regarding an example of luminance signals serving as processing data with the present embodiment, chrominance signals (RGB or the like) may serve as data to be processed.

The gain control unit 212 multiplies the differential signals (H) output from the differentiator 211 by a coefficient following a preset rule (gain coefficient), thereby controlling the amplitude value of the differential signals, and also generating corrected differential signals (H') which are corrected signals of the differential signals.

The nonlinear conversion unit 213 nonlinearly converts the corrected differential signals (H') output from the gain control unit 212, and outputs to the image compositing unit 214 as disparity enhanced signals (E').

The image compositing unit 214 applies the frame images making up the video data, and the spatial feature amounts generated from the frame images, i.e., the corrected differential signals (H') of the luminance signals, or the disparity enhanced signals (E') generated by performing nonlinear conversion of these corrected differential signals, so as to perform processing to generate an image of a new viewpoint.

Note that, as indicated by the dotted line in FIG. 6, a configuration may be made where the conversion processing by the nonlinear conversion unit 213 is omitted, and the corrected differential signals (H') subjected to correction processing at the gain control unit 212 are directly input to the image compositing unit 214, so that the image compositing unit 214 applies the corrected differential signals and generates an image of a new viewpoint.

Next, the processing which the gain control unit 212 executes will be described.

Figure 7:
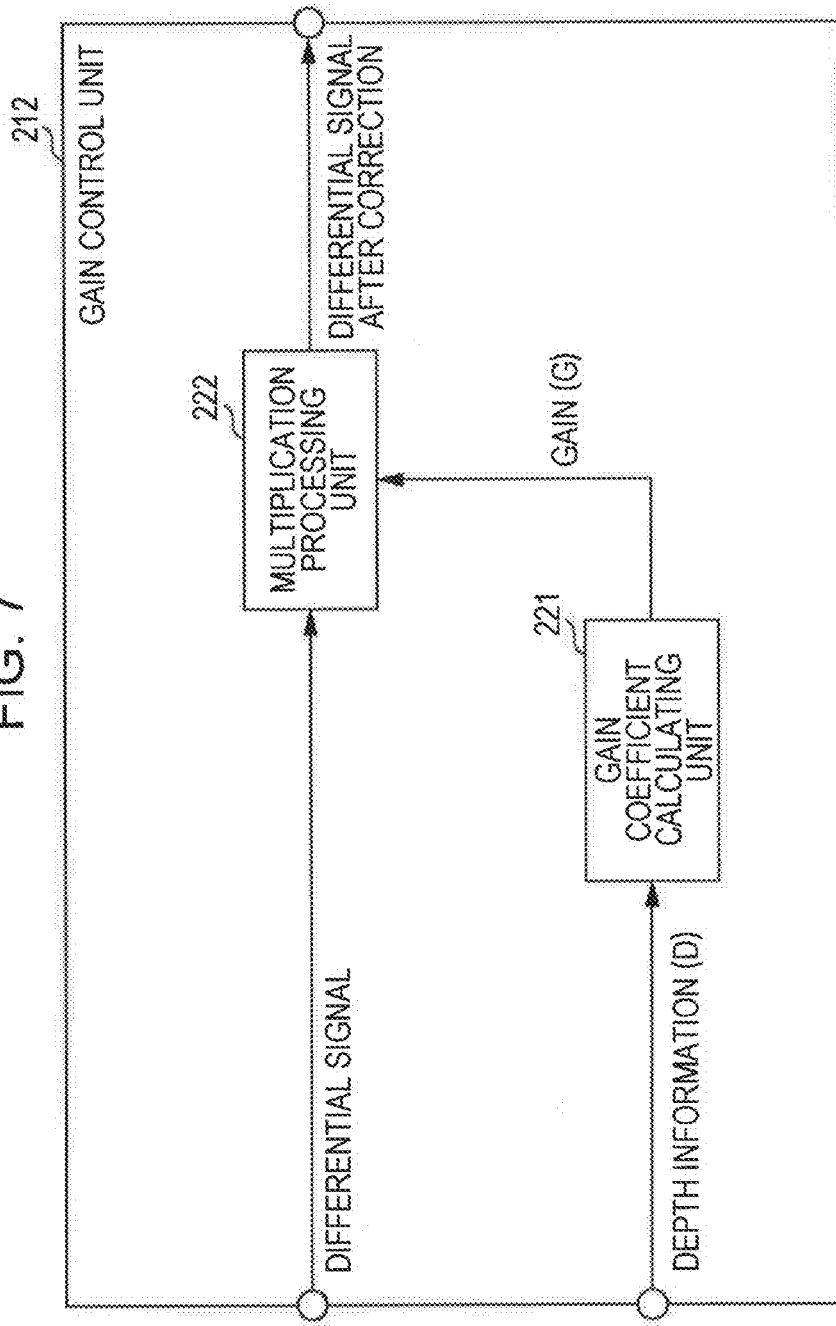
FIG. 7 is a diagram for describing a configuration example of a gain control unit of the 2D3D image converting unit.

FIG. 7 is a block diagram illustrating the configuration of an embodiment of the gain control unit 212. With the gain control unit 212, the amplitude value of that amplitude value of the input differential signals are controlled based on depth information that is also input. Note that with the embodiment described hereinafter, depth information is described as being input in a so-called depth map form, where each pixel of input differential signal has one depth value.

A gain coefficient calculating unit 221 uses depth information regarding each input pixel to output a gain coefficient for the corresponding pixel.

A multiplication processing unit 222 performs multiplication processing to multiply the amplitude values of the differential signals (H) by gain coefficients corresponding to each pixel output from the gain coefficient calculating unit 221, and as a result outputs corrected differential signals (H') of which the amplitude values have been subjected to gain control.

Figure 8:
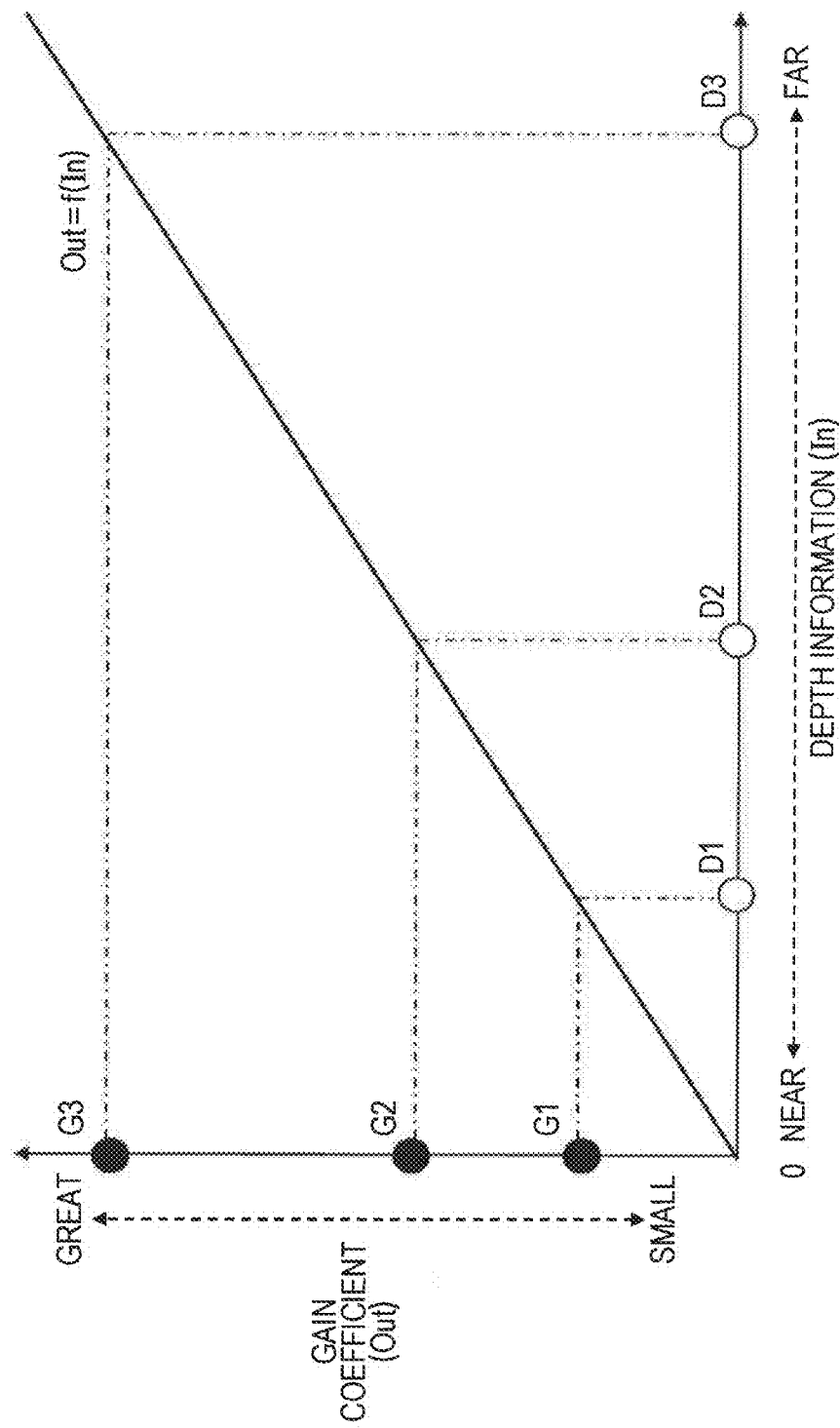
FIG. 8 is a diagram for describing gain control processing of the gain control unit of the 2D3D image converting unit.

FIG. 8 illustrates an example of a gain coefficient deciding method executed at the gain coefficient calculating unit 221. The horizontal axis is input signals, and is depth information. The vertical axis represents the output of gain coefficients at the gain coefficient calculating unit 221.

The gain coefficient calculating unit 221 converts the input depth information (In) by a preset function f(x), and outputs a gain coefficient (Out).

At this time, various settings can be made for the function f(x).

As an example of the function f(x), for example, $$F(x) = A \times x$$

(where A is a constant)

a linear linear function such as illustrated in the above Expression is used. A is a preset constant, and can be set to various values.

Also, the conversion function at the gain coefficient calculating unit 221 is not restricted to a linear linear function, and nonlinear conversion may be performed.

For the depth information, we will say that values corresponding to each of the pixels of the differential signals are input, and gain coefficients corresponding to each of the pixels are output.

FIG. 8 is a diagram illustrating a correlation example of input values (depth information) of the gain coefficient calculating unit, and output values (gain coefficients). FIG. 8 illustrates an example of three input values (depth information) and three corresponding output values (gain coefficients).

The example of input values (depth information) is D1, D2, and D3, assuming depth values corresponding to three certain pixels. Note that depth is a value corresponding to the distance from the observer (user) or camera to the subject.

We will say that the depth (=subject distance) becomes deeper from the near side from the far side (farther from the user or camera), in the order of D1<D2<D3. Now, in FIG. 8, the position of depth information In=0 is a point perceived as being on the display screen when the generated image is displayed on a 3-dimensional display device.

The example of output values (gain coefficients) in this case is G1, G2, and G3, with each being obtained by inputting the values of D1, D2, and D3, to the function f(x) in FIG. 8.

As illustrated in this example, the gain coefficient calculating unit 221 outputs gain coefficients corresponding to the pixels of differential signals.

Figure 9:
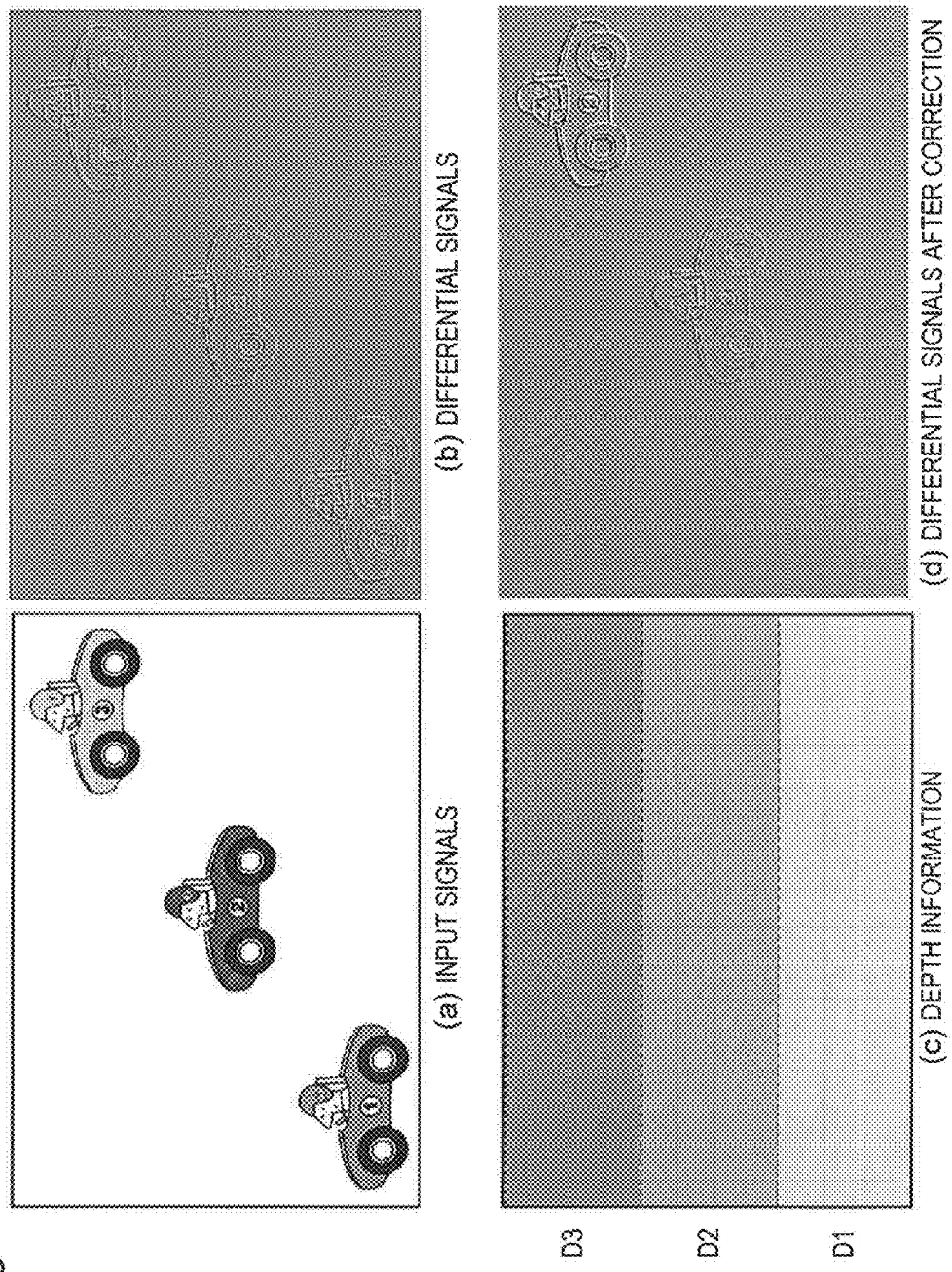
FIG. 9 is a diagram for describing signals applied to 2D3D image conversion processing of the 2D3D image converting unit.

FIG. 9 illustrates an example of processing to control the amplitude values of differential signals at the gain control unit 212.

FIG. 9 illustrates the examples of
(a) input signals
(b) differential signals
(c) depth information
(d) differential signals after correction.

FIG. 9(a) is an example of input image signals.

FIG. 9(b) is an image where the input image signals in FIG. 9(a) have been subjected to differentiation processing.

FIG. 9(c) is depth information corresponding to input image signals of FIG. 9(a), and is a simplified arrangement where the image has been divided into three regions, each of which are provided with depth values.

Now, we will say that the image signals indicating the depth information in FIG. 9(c) have been given the values of depth information: D3, D2, D1 (D1<D2<D3) defined in order from the top in FIG. 8.

At this time, the gain values to be multiplied as to each pixel of the differential signals in FIG. 9(b) are, in order from the top of the image, G3, G2, G1 (G1<G2<G3), following the region of depth and gain values described in FIG. 8.

FIG. 9(d) differential signals after correction is an example of the result of processing where the gain value based on the depth information of FIG. 9(c) has been multiplied on the pixels of the differential signals in FIG. 9(b).

In FIG. 9(d) differential signals after correction, the higher in the screen (the farther the region is) the greater the gain value multiplied is, and the lower in the screen (the nearer the region is) the smaller the gain value multiplied is.

As a result, the higher in the screen (the farther the region is) the greater the amplitude value of differential signals is, and the lower in the screen (the nearer the region is) the smaller the amplitude value of differential signals is.

The 2D3D converting units thus generate and output new viewpoint images using differential signals with different amplitudes in accordance with distance. As a result, images having different disparity in accordance with distance are generated and output.

Next, processing which the nonlinear conversion unit 213 executes will be described. The nonlinear conversion unit 213 generates a disparity enhanced signal (E') where a corrected differential signal (H'), subjected to gain control in accordance with distance output from the gain control unit 212, has been nonlinearly converted, and outputs to the image compositing unit 214.

Figure 10:
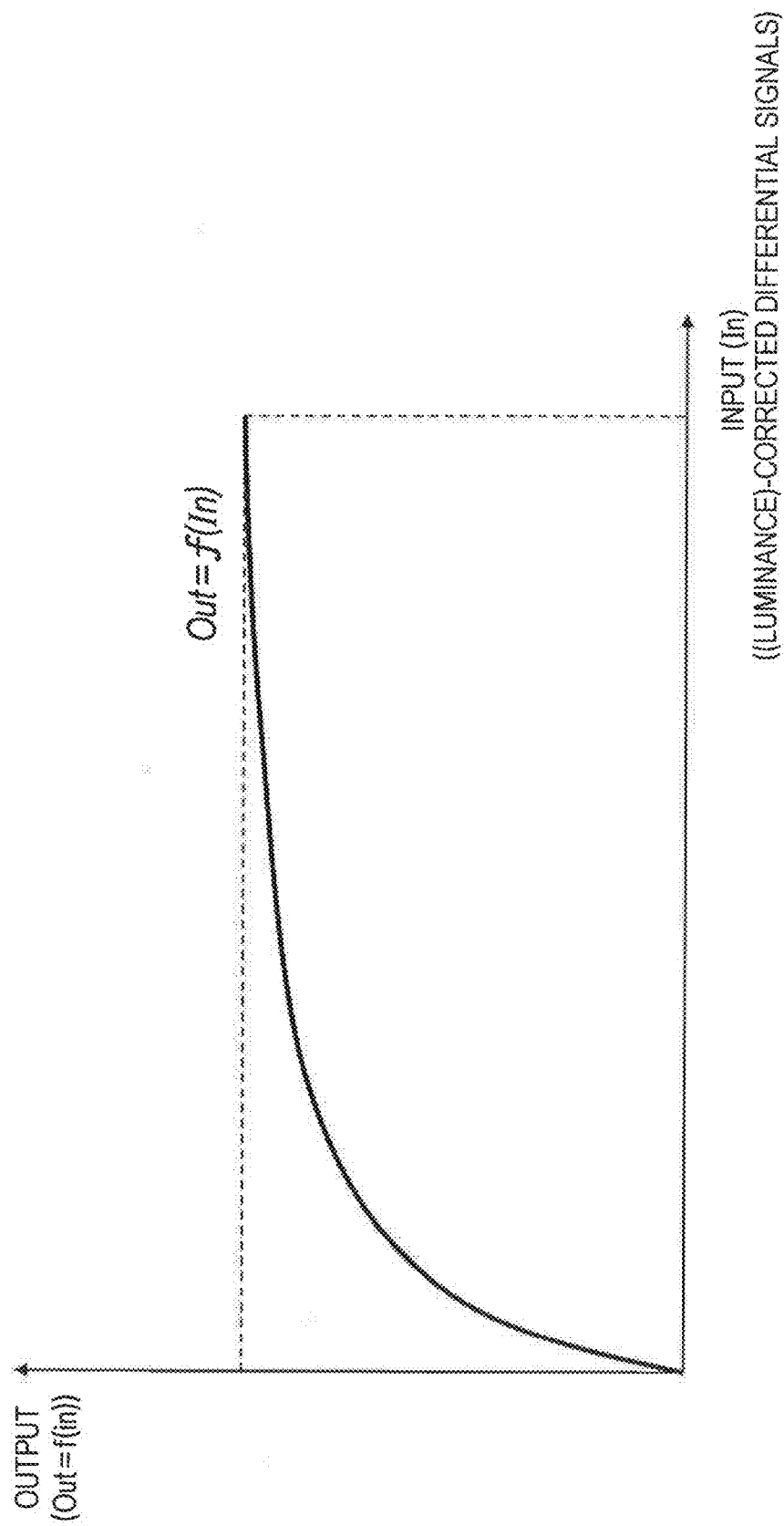
FIG. 10 is a diagram for describing nonlinear conversion processing of a non linear converting unit of the 2D3D image converting unit.

FIG. 10 illustrates an example of nonlinear conversion processing executed at the nonlinear conversion unit 213. The horizontal axis is differential signals subjected to gain control (correction(I in accordance to distance output from the gain control unit 212, and is (luminance) corrected differential signals. The vertical axis represents output after nonlinear conversion processing at the nonlinear conversion unit 213. The nonlinear conversion unit 213 converts the input corrected differential signals (In) by a function f(x) stipulated beforehand, and outputs disparity enhanced signals (Out). That is to say, Out=f(In). At this time, various settings can be used for the function f(x). For an example of the function f(x), $$F(x)=x^{\gamma}$$

an exponent function such as illustrated in the above Expression is used. $\gamma$ is a preset function, and can be set to various values.

Also, the conversion function at the nonlinear conversion unit 213 is not restricted to an exponent function, and linear conversion may be performed.

The image compositing unit 214 performs processing of receiving the disparity enhanced signals output from the nonlinear conversion unit 213 and the video data input to the left image 2D3D converting unit 204, compositing the disparity enhanced signals with each frame image making up the video data, and generating a new viewpoint image.

Note that as indicated by the dotted line in FIG. 5, a configuration may be made where the conversion processing of the nonlinear conversion unit 213 is omitted, and the corrected differential signals (H') where the differential signals generated by the differentiator 211 which have been subjected to gain control in accordance with distance at the gain control unit 212 are directly input to the image compositing unit 214. In this case, the image compositing unit 214 performs processing to generate an image of a new viewpoint, applying corrected differential signals (H') subjected to gain control in accordance with depth (subject distance).

Next, the processing of the image compositing unit 214 will be described.

The image compositing unit 214 performs processing of generating an image of a new viewpoint, applying the frame images making up the video data, and the spatial feature amounts generated from these frame images, i.e., the differential signals of the luminance signals, or the disparity enhanced signals generated by performing nonlinear conversion of these differential signals.

Figure 11:
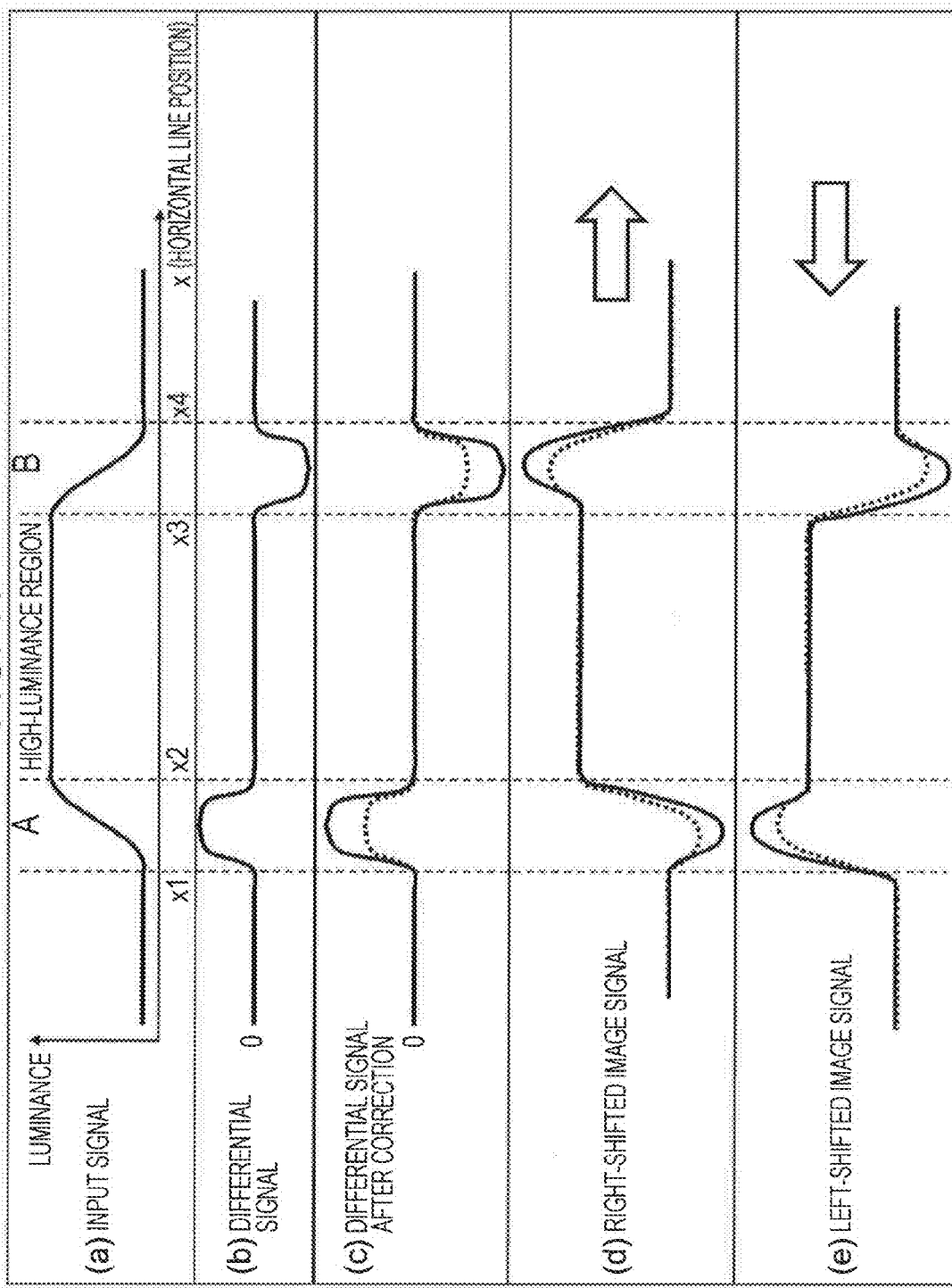
FIG. 11 is a diagram for describing an image signal generating processing example of a new viewpoint image from an input image, which the 2D3D image converting unit performs.
Figure 12:
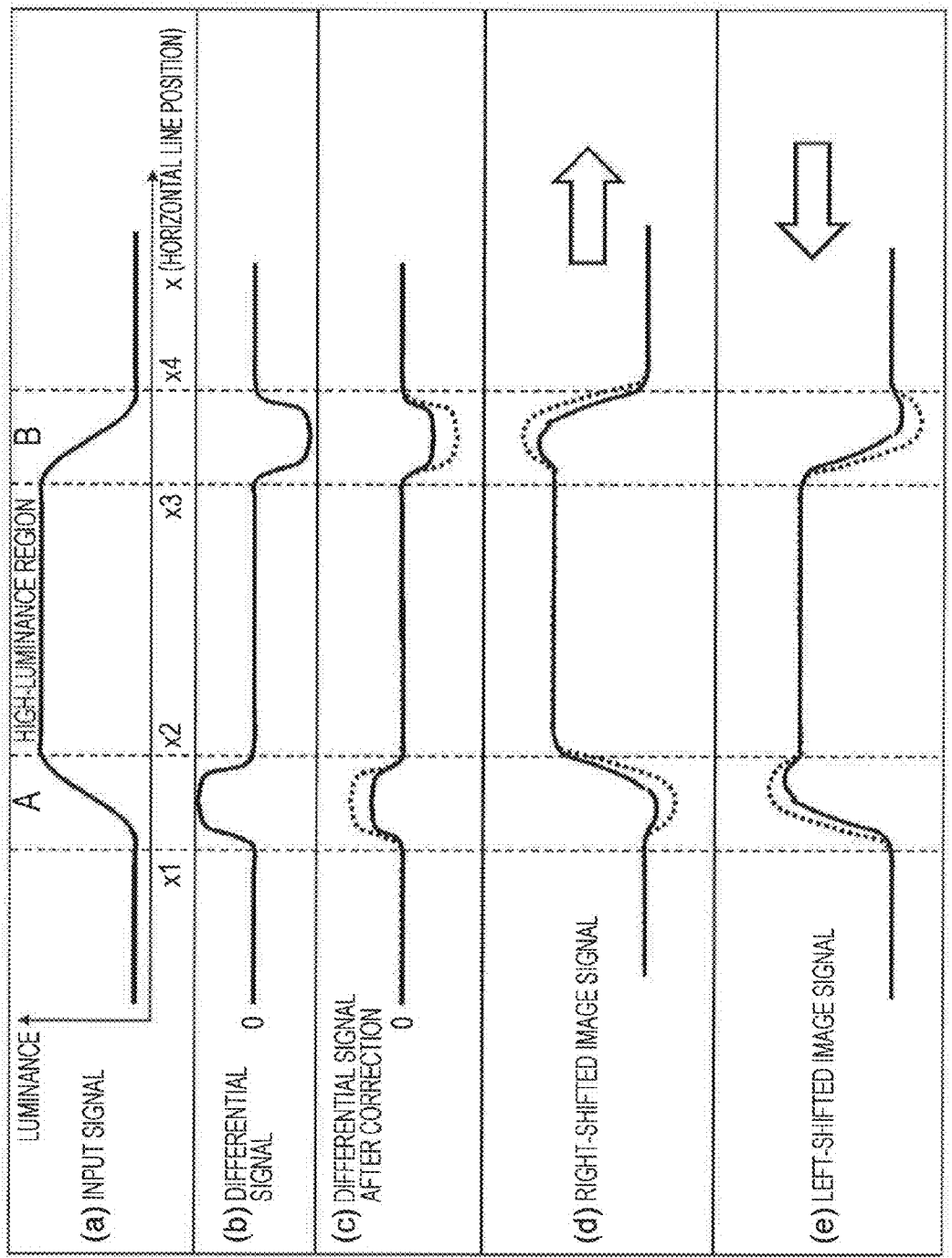
FIG. 12 is a diagram for describing an image signal generating processing example of a new viewpoint image from an input image, which the 2D3D image converting unit performs.

FIG. 11 and FIG. 12 illustrate the concept of image compositing processing which the image compositing unit 214 executes.

FIG. 11 is an image region where distance is great (image region where depth is great)

FIG. 12 is an image region where distance is small (image region where depth is small)

With regard to these image regions, in order from the top,
(a) input signal (S)
(b) differential signal (H)
(c) corrected differential signal (H') after correction (gain control)
(d) right shift image signal
(e) left shift image signal.
these signals are illustrated.

Describing this in correlation with the depth information of (c) in FIG. 9, for example, FIG. 11 is a processing example corresponding to an image region at the upper portion in FIG. 9(c) where the distance is great (=D3) (image region where depth is great). On the other hand, FIG. 12 is a processing example corresponding to an image region at the lower portion in FIG. 9(c) where the distance is small (=D1) (image region where depth is small).

First, the processing example of the image region where the distance is great (image region where depth is great) illustrated in FIG. 11 will be described.

The (a) input signal (S) represents luminance change of any one horizontal line in any one frame of the video data. Exemplarily illustrated is one line where a high luminance region where luminance is high exists at the middle portion. In the region A from line position (x1) to line position (x2), change is exhibited where luminance gradually increases, a high luminesce portion with a high level luminance maintained exists at line position (x2) through (x3), and subsequently, and in the region B from line position (x3) to line position (x4), change is exhibited where luminance gradually decreases.

The (b) differential signal (H) is differentiation results of the (a) input signal. The differential signal is a signal generated at the differentiator 211 of the left image 2D3D converting unit 204 illustrated in FIG. 6.

The differential signal (H) generated by the differentiator 211 has a positive value in the region A where the luminance change of the (a) input signal (S) goes positive, and has a negative value in the region B where the luminance change of the (a) input signal goes negative, as illustrated in FIG. 11.

The (c) corrected differential signal (H') after correction (gain control) is a signal generated at the gain control unit 212 of the left image 2D3D converting unit 204 illustrated in FIG. 6, and is a signal obtained by correcting (gain control) of the FIG. 11(b) differential signal. Note that the example in FIG. 11 is processing in an image region where distance is great (e.g., D3 in FIG. 8 and FIG. 9) (image region where depth is great), where correction processing is performed by greater gain as described with reference to FIG. 8 and FIG. 9, with the amplitude of the differential signal being corrected to a greater amplitude.

The dotted line illustrated in FIG. 11(c) is the signal before correction (=(b) differential signal (H)), and the solid line illustrated in FIG. 11(c) is the corrected differential signal (H') after correction according to distance. In this way, the amplitude of the corrected differential signal (H') is corrected so as to be greater, by gain control according to the distance.

The (d) right shift image signal and (e) left shift image signal are signals generated by the left image 2D3D converting unit 204 illustrated in FIG. 4, and the image compositing unit 214 illustrated in FIG. 5 configured in the right image 2D3D converting unit 205.

For example, if we say that the input left image is the input image illustrated in FIG. 11(a), the left image 2D3D converting unit 204 illustrated in FIG. 4 generates the (e) left shift image signal further shifted to the left, as the first viewpoint image.

Also, if we say that the input right image is the input image illustrated in FIG. 11(a), the right image 2D3D converting unit 205 illustrated in FIG. 4 generates the (d) right shift image signal further shifted to the right, as the fourth viewpoint image.

Specifically, by compositing the (a) input signal (S) with the disparity enhanced signal (E'), which is the result of nonlinear conversion of the (c) corrected differential signal (H') after correction (gain control) (output of the nonlinear conversion unit 213), a (d) right shift image signal or (e) left shift image signal is generated.

As illustrated in FIG. 11(d), in a case of compositing a corrected differential signal (H') of which correction has been performed by a great gain (G3), an image signal with a great right shift is generated as compared with a case of compositing a differential signal (H) before correction. In the same way, an image signal with a great left shift is generated with FIG. 11(d).

Next, the processing example of the image region where the distance is small (image region where depth is small) illustrated in FIG. 12 will be described. FIG. 12 is a processing example corresponding to an image region at the lower portion in FIG. 9(c) where the distance is small (=D1) (image region where depth is small).

The (a) input signal and (b) differential signal are the same as the (a) input signal and (b) differential signal in FIG. 11. The (b) differential signal (H) is differentiation results of the (a) input signal. The differential signal is a signal generated at the differentiator 211 illustrated in FIG. 6. The differential signal (H) generated by the differentiator 211 has a positive value in the region A where the luminance change of the (a) input signal goes positive, and has a negative value in the region B where the luminance change of the (a) input signal goes negative, as illustrated in FIG. 12.

The (c) corrected differential signal (H') after correction (gain control) is a signal generated at the gain control unit 212 of the left image 2D3D converting unit 204 illustrated in FIG. 6, and is a signal obtained by correcting (gain control) of the FIG. 12(b) differential signal.

The example in FIG. 12 is processing in an image region where distance is small (e.g., D1 in FIG. 8 and FIG. 9) (image region where depth is small), where, as described with reference to FIG. 8 and FIG. 9, the amplitude of the differential signal is corrected to a smaller amplitude by small gain (G1).

The dotted line illustrated in FIG. 12(c) is the signal before correction (=(b) differential signal), and the solid line illustrated in FIG. 12(c) is the signal after correction according to distance. In this way, the amplitude is corrected so as to be smaller, by gain control according to the distance.

The (d) right shift image signal and (e) left shift image signal are signals generated by the image compositing unit 214 illustrated in FIG. 6. The image compositing unit 214 composites the (a) input signal (S) with the disparity enhanced signal (E'), which is the result of nonlinear conversion of the (c) corrected differential signal (H') after correction (gain control) (output of the nonlinear conversion unit 213), thereby generating a (d) right shift image signal or (e) left shift image signal.

For example, if we say that the input left image is the input image illustrated in FIG. 12(a), the left image 2D3D converting unit 204 illustrated in FIG. 4 generates the (e) left shift image/signal further shifted to the left, as the first viewpoint image.

Also, if we say that the input right image is the input image illustrated in FIG. 12(a), the right image 2D3D converting unit 205 illustrated in FIG. 4 generates the (d) right shift image signal further shifted to the right, as the fourth viewpoint image.

As illustrated in FIG. 12(d), in a case of compositing a corrected differential signal (H') of which correction has been performed by a small gain (G1), an image signal with a small right shift is generated as compared with a case of compositing a differential signal (H) before correction. In the same way, an image signal with a small left shift is generated with FIG. 12(d).

In this way, with the image processing device, in a case of generating an image so as to be perceived in the direction deeper from the display screen, in the case of distance=great, corrected differential signal with great amplitude in the case of distance=small, corrected differential signal with small amplitude these corrected differential signals ((c) in FIG. 11 and FIG. 12) are generated, and by compositing processing of these corrected differential signals (or disparity enhanced signals which are the nonlinear conversion results thereof) and the (a) input signals, the (d) right shift image signal or (e) left shift image signal is generated.

Generating processing of such a (d) right shift image signal and (e) left shift image signal will be described by way of mathematical expressions.

We will say that luminance level of video data equivalent to the (a) input signal in FIG. 11 and FIG. 12 is (S), and that the signal level of the (b) differential signal illustrated in (b) in FIG. 11 and FIG. 12 is (H).

Also, we will say that the signal level of the corrected differential signal obtained as the correction result of the differential signal performed at the gain control unit 212 is (H').

Note that at the time of generating the corrected differential signal (H'), the gain value (G) to be multiplied on the (b) differential signal (H) is decided from a function set beforehand based on the depth information (D), or the like.

We will say that the gain value in the case of the great distance illustrated in FIG. 11 is G3, the gain value in the case of the small distance illustrated in FIG. 12 is G1.

The examples illustrated in FIG. 11 and FIG. 12 assume a relation of G3>1>G1.

Expressing the signal level of the (c) corrected differential signal (H') after correction as (H'), (H') can be expressed by the following expressions as a signal corrected using the aforementioned gain values G3 and G1.

The corrected differential signal (H') in the case of the great distance illustrated in FIG. 11 is $$H'=G3 \times H$$

The corrected differential signal (H') in the case of the small distance illustrated in FIG. 12 is $$H'=G1 \times H$$

Signals calculated by these expressions become (c) the corrected differential signal (H') in FIG. 11 and FIG. 12.

In the case of the great distance illustrated in FIG. 11(c), comparing the corrected differential signal (H') indicated by a solid line with the differential signal before correction (=(b)) indicated by a dotted line shows that the corrected differential signal (H') indicated by the solid line has a greater amplitude than the differential signal before correction indicated by the dotted line.

On the other hand, in the case of the small distance illustrated in FIG. 12(c), comparing the corrected differential signal (H') indicated by a solid line with the differential signal before correction (=(b)) indicated by a dotted line shows that the corrected differential signal (H') indicated by the solid line has a smaller amplitude than the differential signal before correction indicated by the dotted line.

This is because the corrected differential signals illustrated in FIG. 11(c) and FIG. 12(c) have been generated by being multiplied by different gain values.

That is to say, for pixels regarding which the depth information output by the depth detecting unit 203 is great (the distance from the camera is great), the (b) differential signal is corrected by being multiplied by a great gain value, and the corrected differential signal illustrated in FIG. 11(c) is generated.

On the other hand, for pixels regarding which the depth information output by the depth detecting unit 203 is small (the distance from the camera is near), the (b) differential signal is corrected by being multiplied by a small gain value, and the corrected differential signal illustrated in FIG. 12(c) is generated.

The corrected differential signals illustrated in FIG. 11(c) and FIG. 12(c) are subjected to nonlinear conversion processing at the nonlinear conversion unit 213 under the settings described with reference to FIG. 10 earlier, thereby generating the disparity enhanced signal (E').

The image compositing unit 214 inputs the video data (S) equivalent to the (a) input signal and the disparity enhanced signal (E') where the (c) corrected differential signal (H') has been subjected to linear conversion, and generates a right shift image signal (Right) or left shift image signal (Left) by the following Expressions, for example.

$$\text{Right}=S-E'$$

$$\text{Left}=S+E'$$

The signals obtained thereby are the right shift image signal indicated by solid lines in FIG. 11(d) and FIG. 12(d), and the left shift image signal in FIG. 11(e) and FIG. 12(e).

On the other hand, the signals indicated by dotted lines in FIGS. 11(d) and (e) and FIGS. 12 (d) and (e) are not (c) corrected differential signals but rather are equivalent to differential signals before correction, i.e., the right shift image signal and left shift image signal generated using the disparity enhanced signal (E) where nonlinear conversion has been performed applying the (b) differential signal (H). That is to say, $$\text{Right}=S-E$$

$$\text{Left}=S+E$$

holds.

Comparing the solid lines and dotted lines illustrated in the (d) right shift image signal and (e) left shift image signal in FIG. 11 and FIG. 12, in the case illustrated in FIG. 11 where the distance is great, both the (d) right shift image signal and (e) left shift image signal have an edge portion (change portion of the signals) where the solid line (corrected differential signal) is steeper than that of the dotted line (differential signal before correction), with the shift of signals being greater as compared to the (a) input signal.

On the other hand, in the case illustrated in FIG. 12 where the distance is small, both the (d) right shift image signal and (e) left shift image signal have an edge portion (change portion of the signals) where the solid line (corrected differential signal) is smoother than that of the dotted line (differential signal before correction), with the shift of signals being smaller as compared to the (a) input signal.

That is to say, in the event that the distance is great, the difference between the (d) right shift image signal and (e) left shift image signal is enlarged, and in the event that the distance is small, the difference between the (d) right shift image signal and (e) left shift image signal is reduced.

By displaying such a (d) right shift image signal and (e) left shift image signal, in the event that the distance is great, the retinal disparity of the (d) right shift image signal and (e) left shift image signal is increased, and thus sensed farther away, while in the event that the distance is small, the retinal disparity of the (d) right shift image signal and (e) left shift image signal is decreased, and thus sensed closer.

While description has been made with the present embodiment with reference to a method of generating disparity deeper than the display screen, in the event of generating disparity nearer than the display screen, the image compositing unit 214 generates right shift image signals (Right) or left shift image signals (Left) according to the following Expressions.

Right=$S+E'$

Left=$S-E'$

Thus, the shift of the right shift image signal and the left shift image signal occurs in the opposite direction, so the right shift image signal is shifted to the left of the input image, and the left shift image signal is shifted to the right of the input image. As a result, the generated right shift image signal and left shift image signal are perceived as being closer than the display screen.

[3. About Second Embodiment of Image Processing Device]

Figure 13:
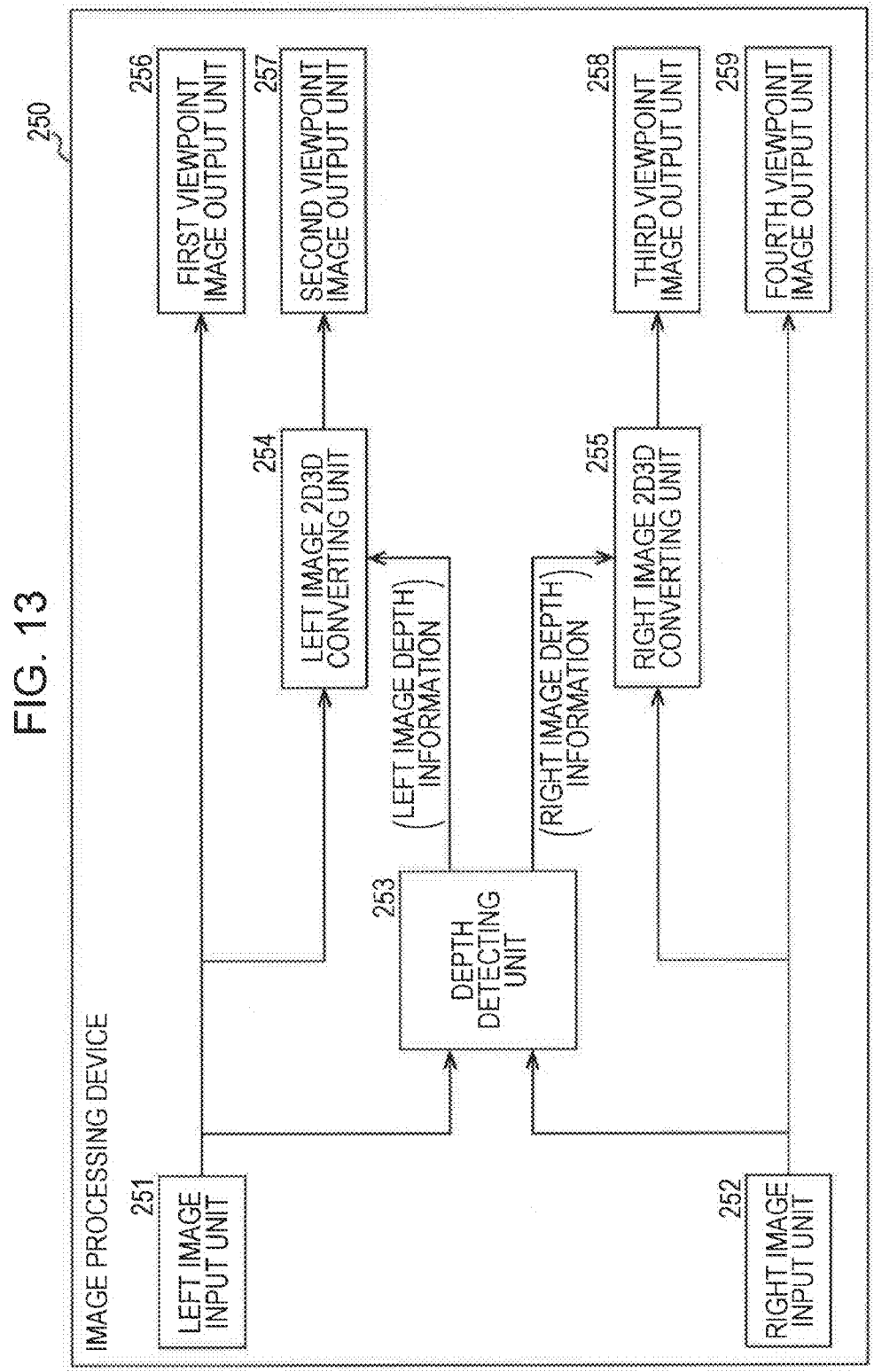
FIG. 13 is a diagram for describing a configuration example of an image processing device according to a second embodiment of the present disclosure.

FIG. 13 is a configuration diagram of a second embodiment of the image processing device according to the present disclosure. As with the first embodiment, the second embodiment is a device which takes two different viewpoints left and right (left image, right image), and performs multi-viewpoint image generating where images of four viewpoints of a first through a fourth are output.

However, the second embodiment differs in that, unlike the first embodiment, the input images are output as the first viewpoint image and fourth viewpoint image, and images generated at the 2D3D converting units are taken as the second viewpoint image and third viewpoint image. Note that the first through fourth viewpoint images correspond to the first through fourth viewpoint images in FIG. 3, and correspond to shot images from the left side viewpoint to the right side viewpoint in order.

The input image is a combination of a left eye image (left image) and a right eye image (right image) to be applied to 3D image display. With the present embodiment, the first viewpoint image 113 shot at viewpoint 1, 103, and the fourth viewpoint image 114 shot at viewpoint 4, 104, in the example illustrated in FIG. 3, are input images.

The image processing device 250 illustrated in FIG. 13 outputs the input left image as it is as a first viewpoint image.

A second viewpoint image which is a shot image from a viewpoint further to the right of the left image is generated by 2D3D conversion processing based on the input left image (first viewpoint image).

Further, a fourth viewpoint image which is a shot image from a viewpoint further to the left of the right image is generated by 2D3D conversion processing based on the input right image (fourth viewpoint image).

the input right image is output as it is as a fourth viewpoint image.

Processing executed with this image processing device according to the configuration of the image processing device 250 illustrated in FIG. 13 will be described.

A left image input unit 251 inputs a left image (first vie point image). The input left image (first viewpoint image) is input to a depth detecting unit 253 and a left image 2D3D converting unit 254.

In the same way, a right image input unit 252 inputs a right image (fourth viewpoint image). The input right image (fourth viewpoint image) is input to the depth detecting unit 253 and a right image 2D3D converting unit 255.

The depth detecting unit 253 detects which of the pixels or blocks in the right image that the pixels or blocks in the left image correspond to, and left image depth information where the difference in position is saved at a position corresponding to that pixel in the left image, and detects which of the pixels or blocks in the left image that the pixels or blocks in the right image correspond to, and generates right image depth information where the difference in position is saved, at a position corresponding to that pixel in the right image.

These processing are the same as the processing with the first embodiment described with reference to FIG. 4.

The depth detecting unit 253 generates left side depth information corresponding to the left image (e.g., distance image), and supplies this to the left image 2D3D converting unit 254. Further, right side depth information corresponding to the left image (e.g., distance image) is generated, and supplied to the right image 2D3D converting unit 255.

The left image 2D3D converting unit 254 inputs the left image (first viewpoint image) input from the left image input unit 251 and the left image depth information (e.g., a distance image) generated at the depth detecting unit 253, and using this information, generates a second viewpoint image equivalent to a shot image from a viewpoint further to the right side from the input left image (second viewpoint image).

In the same way, the right image 2D3D converting unit 255 inputs the right image (fourth viewpoint image) input from the right image input unit 252 and the right image depth information (e.g., a distance image) generated at the depth detecting unit 253, and using this information, generates a third viewpoint image equivalent to a shot image from a viewpoint further to the left side from the input right image (fourth viewpoint image).

The left image which the left image input unit 251 has input, i.e., the first viewpoint image, is output via a first viewpoint image output unit 256.

The second viewpoint image which the left image 2D3D converting unit 254 has generated is output via a second viewpoint image output unit 257.

The third viewpoint image which the right image 2D3D converting u nit 255 has generated is output via a third viewpoint image output unit 2583.

The right image which the right image input unit 252 has input, i.e., the fourth viewpoint image, is output via a fourth viewpoint image output unit 259.

Note that the output destination of the images is, for example, a device executing display processing of 3D image display, or a storage device recording 3D image data, or the like. Alternatively, this may be output as communication data as to a device connected via a network.

With regard to these four different viewpoint images, in the same way as with the first embodiment described earlier, at the time of executing 3D image display at a display device for example, two images are appropriately selected in accordance with the observation position of the user, and output as a left eye image and right eye image. That is to say, 3D image presentation is enabled where occurrence of pseudoscopy or crosstalk, where the right eye image enters the left eye and the left eye image enters the right eye, or the right eye image and left eye image become mixed, is suppressed.

With the image display device 250 illustrated in this FIG. 13, the left image 2D3D converting unit 254 and right image 2D3D converting unit 255 input images from the image input units and image depth information (e.g., a distance image) generated at the depth detecting unit 253, and using this information, and generate images equivalent to shot images from viewpoints different from the input image.

This processing is executed as processing for generating a new viewpoint by processing such as deciding phase change amount (shift amount) using depth information for example, and shifting the image. The spatial resolution of image depth information used at the 2D3D converting units does not necessarily have to be high, and the left image depth information and right image depth information output from the depth detecting unit 253 can be made to be data of information amount smaller than the number of pixels of the input image, so the circuit scale of the depth detecting unit can be reduced.

A specific processing example of new viewpoint image generating processing which the left image 2D3D converting unit 254 and right image 2D3D converting unit 255 perform based on the depth information generated by the depth detecting unit 253 will be described with reference to FIG. 14 for the image processing device 250 illustrated in FIG. 13, as well.

Figure 14:
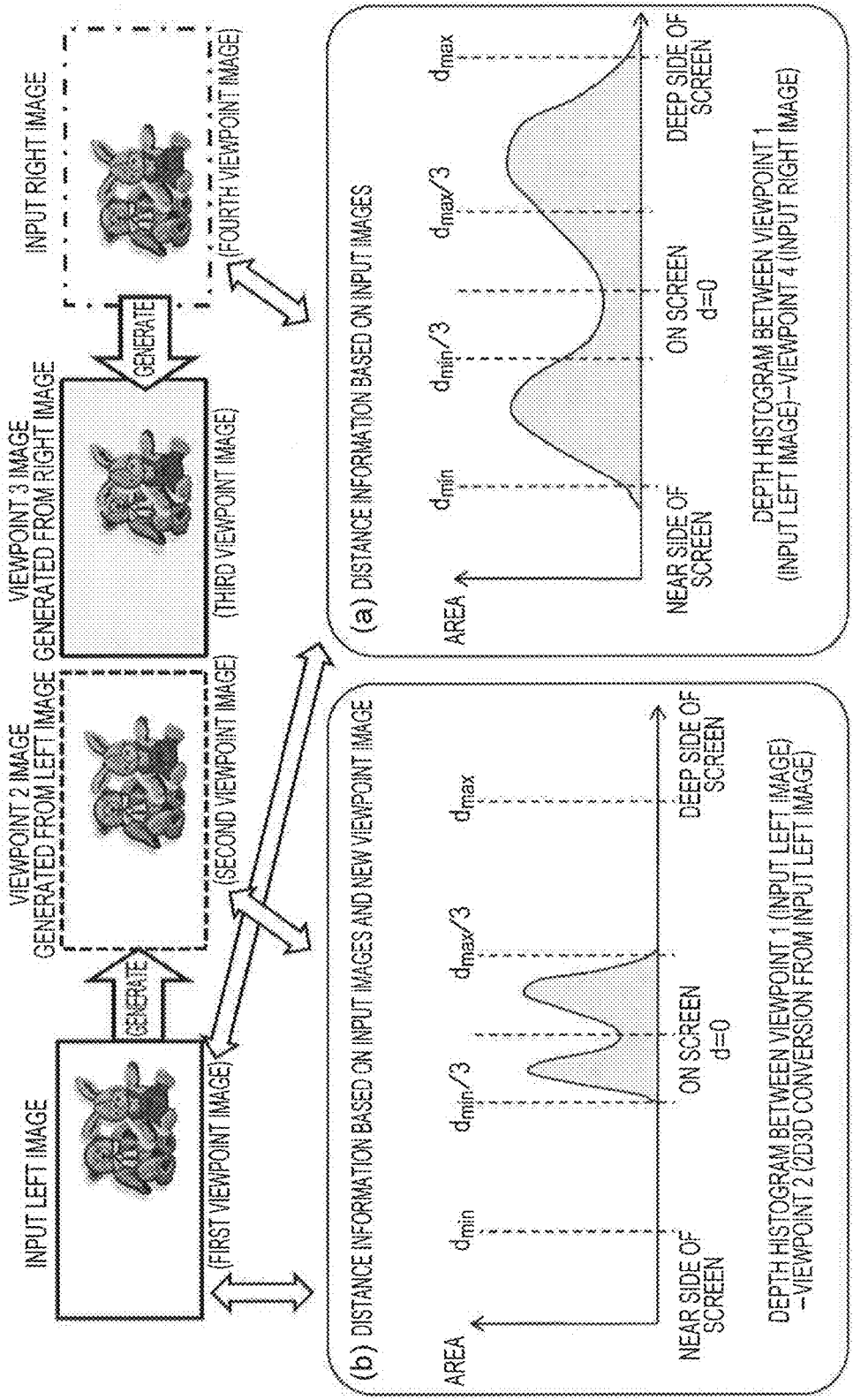
FIG. 14 is a diagram for describing generating processing of a new viewpoint image based on distance information.

FIG. 14 illustrates left and right input images in the embodiment illustrated in FIG. 13, and depth information between newly-generated viewpoint images. The graph (a) shown at the lower right of FIG. 14 represents a histogram of depth information, detected between a left image input via the left image input unit 251 (equivalent to the first viewpoint image) and a right image input via the right image input unit 252 (equivalent to the fourth viewpoint image).

That is to say, this is depth information which the depth detecting unit 253 has detected.

Now, depth information is expressed as a distance d between the corresponding positions of the two images. That is to say, this is inter-pixel distance on the image of corresponding pixels in the left image and right image, detected by processing such as block matching and so forth.

With the histogram illustrated in FIG. 14(a), the horizontal axis represents the distance information d which changes in accordance with the distance to the subject, and the vertical axis represents the pixel area having each distance.

In the event that distance d=0, this is a state where the corresponding pixels in the left image and the right image have been detected at the same positions in the images, which is a so-called state with no disparity. An image of such pixel positions can be observed at the screen position of the display screen.

On the other hand, in the event that the distance d is smaller than 0 (the right image exists to the left side of the left image), a subject image is observed to the near side of the screen.

Also, in the event that the distance d is greater than 0 (the right image exists to the right side of the left image), a subject image is observed to the far side of the screen.

The left image 2D3D converting unit 254 and the right image 2D3D converting unit 255 first obtain the minimum value dmin and maximum value dmax of the distance d, from the histogram of depth information shown in FIG. 14(a), which is obtained from the generated information from the depth detecting unit 253.

Note that the values of the minimum value dmin and maximum value dmax may be set several percent on the inner side from the actual maximum value and minimum value of the histogram, taking into consideration the effects of noise. FIG. 14(a) illustrates a line for the minimum value dmin and maximum value dmax several percent on the inner side from the actual measurement values.

The minimum value dmin thus obtained is a value corresponding to the depth of the subject situated at the forefront of the input image, and the maximum value dmax is a value corresponding to the depth of the subject situated at the deepest position of the input image.

In the embodiment illustrated in FIG. 13, the left image 2D3D converting unit 254 generates a second viewpoint image further to the right from the input left image (first viewpoint image), by 2D3D conversion processing from the input left image (first viewpoint image).

At this time, the depth between the input left and right images is equally divided into three, and the newly generated second viewpoint image is generated as an image viewed from a viewpoint near to the input left image. On the other hand, the depth between the input left and right images is equally divided into three, and the newly generated third viewpoint image is generated as an image viewed from a viewpoint near to the input right image.

Accordingly, information where the depth is compressed to ⅓ by using depth information obtained for the left and right images illustrated in FIG. 14(a) (we will say that the minimum value of depth is dmin/3 and the maximum value of depth is dmax/3), i.e., the histogram illustrated in FIG. 14(b), is set.

The second viewpoint image is generated such that the depth histogram illustrated in this FIG. 14(b) is obtained as a depth histogram between the input left image (first viewpoint image) and the newly-generated second viewpoint image.

As such a setting, images of viewpoint 2 and viewpoint 3 which divide between the viewpoint 1 and viewpoint 4 which are the input images into three equal parts are generated at the left image 2D3D converting unit 254 and right image 2D3D converting unit 255.

Thus, with the 2D3D converting units, an inter-image distance difference between maximum distance and minimum distance subjects is calculated, from depth information calculated or estimated based on input image signals for the right eye and input image signals for the left eye, and new viewpoint images with inter-image distance difference between the viewpoint images being divided a approximately equally are generated, in accordance with the number of viewpoint images to be ultimately output.

The 2D3D conversion processing at the left image 2D3D converting unit 254 and right image 2D3D converting unit 255 can be executed by processing the same as that described with reference to FIG. 6 through FIG. 12 earlier for example, i.e., by shift processing where the shift amount of input images is controlled in accordance with the subject distance.

With the embodiment having the configuration in FIG. 13, processing is performed based on depth information where depth information obtained based on the input image (dmin through dmax in FIG. 14(a)) has been compressed to ⅓, as illustrated in FIG. 14(b).

Figure 15:
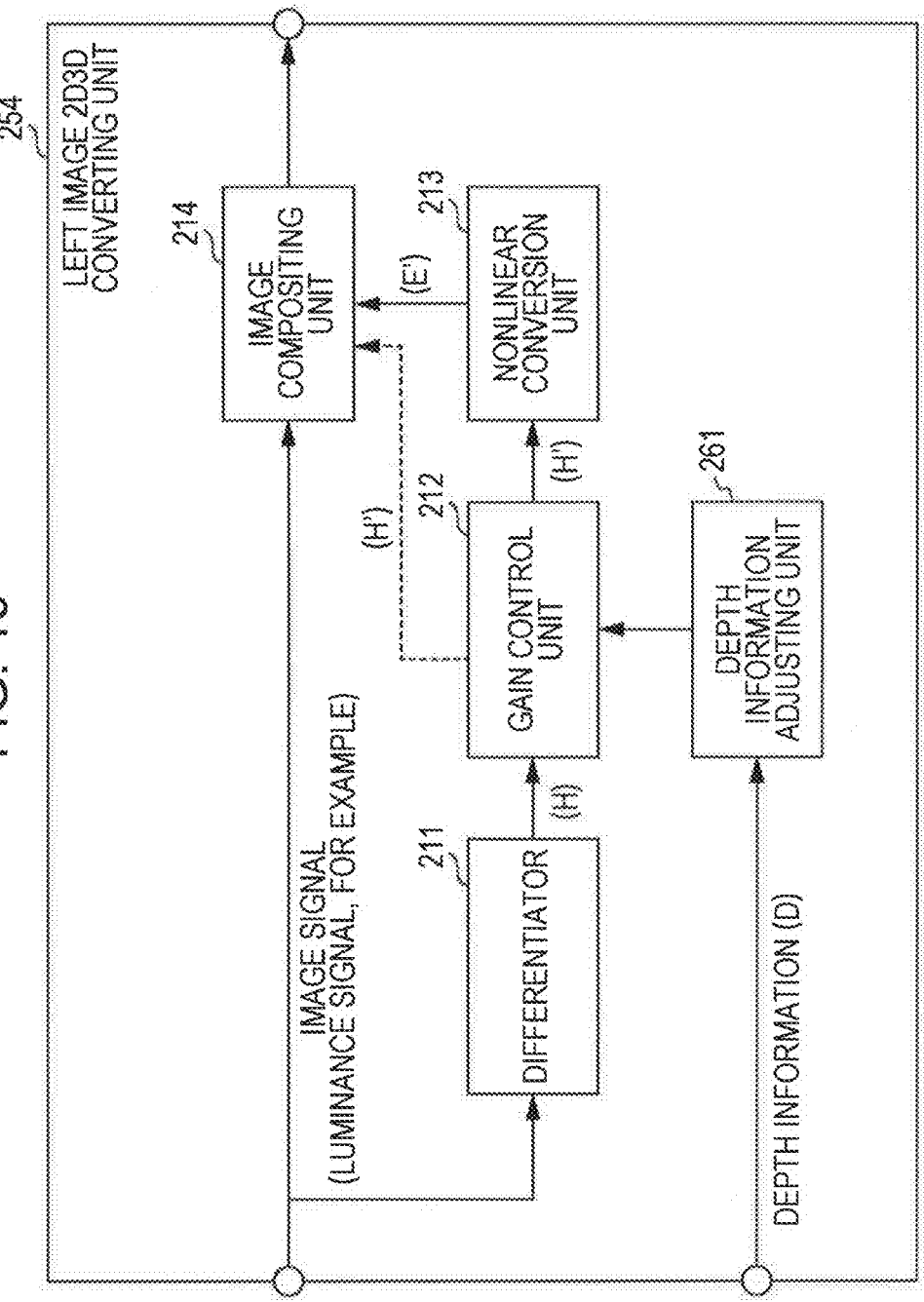
FIG. 15 is a diagram for describing a configuration example of a 2D3D image converting unit.

FIG. 15 is a block diagram illustrating the configuration of an embodiment of the left image 2D3D converting unit 254. Note that the left image 2D3D converting unit 254 and right image 2D3D converting unit 255 only change the shift direction in accordance with a newly-generated image. Hereinafter, a detailed example of 2D3D conversion processing by controlling shift amount in accordance with distance information will be described with the left image 2D3D converting unit 254 as a representative example.

The left image 2D3D converting unit 254 according to the present embodiment is of a configuration where a depth information adjusting unit 261 has been added to the configuration of the left image 2D3D converting unit 254 according to the first embodiment, described earlier with reference to FIG. 6. Other configurations are as the same as with the configuration of the left image 2D3D converting unit 254 according to the first embodiment described earlier with reference to FIG. 6.

The depth information adjusting unit 261 generates depth information where depth information obtained based on the generated information of the depth detecting unit 203 based on the input image (dmin through dmax in FIG. 14(a)) has been compressed to ⅓. This compressed depth information is input to the gain control unit 212. Subsequent processing is the same processing as the 2D3D conversion processing according to the first embodiment described earlier.

FIG. 14(b) illustrates a histogram of depth information between the first viewpoint image (input left image) and newly-generated second viewpoint image (generated from the input left image by 2D3D conversion processing).

Note that the depth between the first viewpoint image (input left image) and newly-generated second viewpoint image is preferably equivalent to ⅓ the depth between the input left and right images, 2D3D conversion processing is not always capable of generating disparity equivalent to the input depth information. The disparity amount generated by the 2D3D conversion processing is determined by gain settings controlling shift amount, and conversion filter properties, so control is effected such that the maximum disparity does not exceed the disparity between input images, by control based on depth information.

Accordingly, according to this control, the left image 2D3D converting unit 254 generates the second viewpoint image generated by 2D3D conversion processing as an image of a viewpoint further to the right side of the input left image (first viewpoint image), by a shift amount equivalent to or less than ⅓ of this shift amount as to the input right image (fourth viewpoint image).

The right image 2D3D converting unit 255 also generates the newly-generated third viewpoint image as an image of a viewpoint further to the left side of the input right image (fourth viewpoint image), by a shift amount equivalent to or less than ⅓ of this shift amount as to the input left image (first viewpoint image)

[4. About Third Embodiment of image Processing Device]

Figure 16:
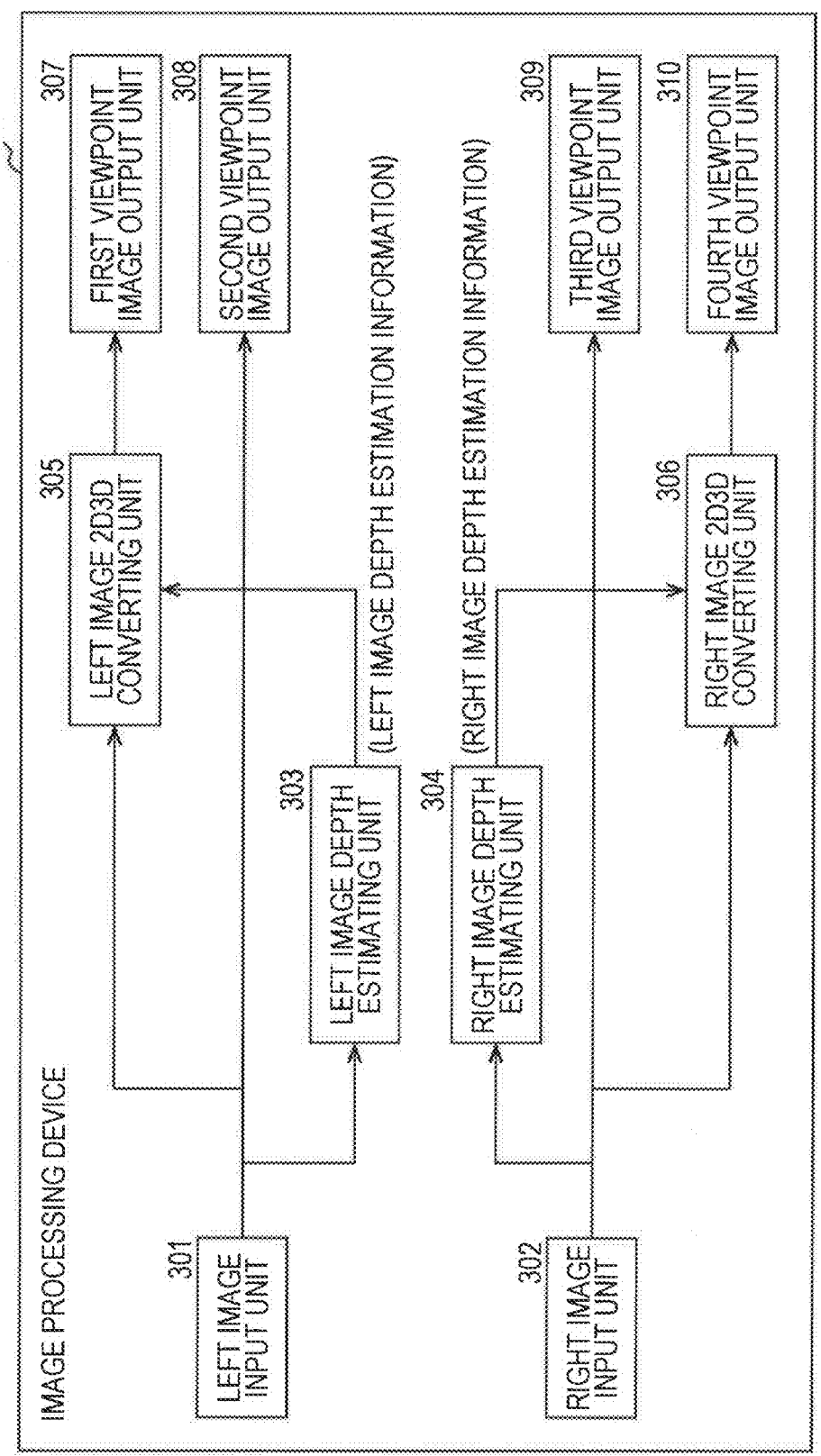
FIG. 16 is a diagram for describing a configuration example of an image processing device according to a third embodiment of the present disclosure.

FIG. 16 is a configuration diagram of a third embodiment of the image processing device according to the present disclosure.

As with the first embodiment, the third embodiment is a device which takes two different viewpoints left and right (left image, right image) as input, and performs multi-viewpoint image generating where images of four viewpoints of a first through a fourth are output.

The input images are output as the second viewpoint image and third viewpoint image, and images generated at the 2D3D converting units are taken as the first viewpoint image and fourth viewpoint image and output. This configuration is the same as with the first embodiment described with reference to FIG. 4.

The difference with the first embodiment is that the depth detecting unit 203 illustrated in FIG. 4 is not had and a left image depth estimating unit 303 and right image depth estimating unit 304 are had.

Processing executed with this image processing device according to the configuration of the image processing device 300 illustrated in FIG. 16 will be described.

A left image input unit 301 inputs a left image (second viewpoint image). The input left image (second viewpoint image) is input to the left image depth estimating unit 303 and a left image 2D3D converting unit 305.

In the same way, a right image input unit 302 inputs a right image (third viewpoint image). The input right image (third viewpoint image) is input to the right image depth estimating unit 304 and a right image 2D3D converting unit 306.

The left image depth estimating unit 303 calculates image feature amount (luminance distribution edge distribution, etc.) of the input left image, estimates the depth, at each position in the input image (in pixel increments or block increments) from the feature amount, and generates depth estimation information corresponding to the position and provides this to the left image 2D3D converting unit 305.

The right image depth estimating unit 304 calculates image feature amount (luminance distribution edge distribution, etc.) of the input right image, estimates the depth at each position in the input image (in pixel increments or block increments) from the feature amount, and generates depth estimation information corresponding to the position and provides this to the right image 2D3D converting unit 306.

Note that for the processing to estimate the depth at each position in the input image (in pixel increments or block increments) from image feature amount (luminance distribution edge distribution, etc.) of the image, various existing depth estimation processing can be applied. Specifically, for example,

["Make3D: Learning 3-D Scene Structure from a Single Still Image", Ashutosh Saxena, Min Sun, Andrew Y. Ng, In IEEE Transactions on Pattern Analysis and Machine Intelligence (PAMI), 2008.]

["Automatic Photo Pop-up", D. Hoiem, A. A. Efros, and M. Hebert, ACM SIGGPAPH 2005.]

processing described in the above literature can be applied.

The left image 2D3D converting unit 305 inputs the left image (second viewpoint image) input from the left image input unit 301 and the left image depth information generated at the left image depth estimating unit 303, and using this information, generates a first viewpoint image equivalent to a shot image from a viewpoint further to the left side from the input left image (second viewpoint image).

In the same way, the right image 2D3D converting unit 306 inputs the right image (third viewpoint image) input from the right image input unit 302 and the right image depth information generated at the right image depth estimating unit 304, and using this information, generates a fourth viewpoint image equivalent to a shot image from a viewpoint further to the right side from the input right image (third viewpoint image).

The new viewpoint image generating processing at these 2D3D converting units may be executed as processing the same as the processing with the first embodiment and second embodiment described earlier with reference to FIG. 5 through FIG. 12, and FIG. 14 through FIG. 15.

The first viewpoint image which the left image 2D3D converting unit 305 has generated is output via a first viewpoint image output unit 307.

The left image which the left image input unit 301 has input, i.e., the second viewpoint image, is output via a second viewpoint image output unit 308.

The right image which the right image input unit 302 has input, i.e., the third viewpoint image, is output via a third viewpoint image output unit 309.

The fourth viewpoint image which the right image 2D3D converting unit 306 has generated is output via a fourth viewpoint image output unit 310.

The output destination is a display device or a storage device or output as communication data as via a network.

With regard to these four different viewpoint images, in the same way as with the embodiments described earlier, by appropriately selecting combination of images in accordance with the position of the user with a naked-eye 3D display device, 3D image presentation is enabled where occurrence of pseudoscopy or crosstalk is suppressed.

[5. About Fourth Embodiment of Image Processing Device]

Figure 17:
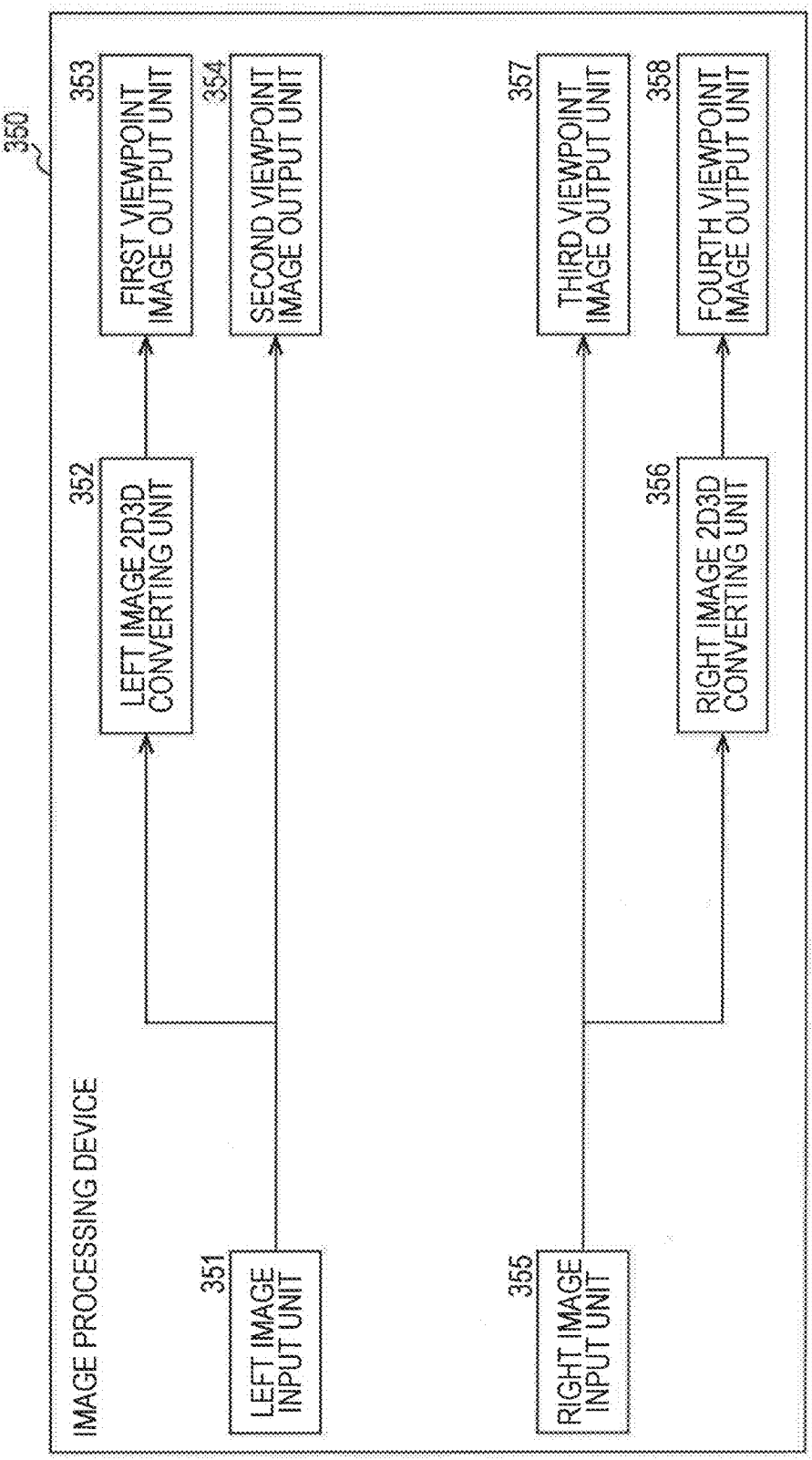
FIG. 17 is a diagram for describing a configuration example of an image processing device according to a fourth embodiment of the present disclosure.

FIG. 17 is a configuration diagram of a fourth embodiment of the image processing device according to the present disclosure.

As with the first embodiment, the fourth embodiment is a device which takes two different viewpoints left and right (left image, right image) as input, and performs multi-viewpoint image generating where images of four viewpoints of a first through a fourth are output.

The input images are output as the second viewpoint image and third viewpoint image, and images generated at the 2D3D converting units are taken as the first viewpoint image and fourth viewpoint image and output. This configuration is the same as with the first embodiment described with reference to FIG. 4.

The configuration of the fourth embodiment has neither the depth detecting unit 203 illustrated in FIG. 4, nor the depth estimating unit used in the third embodiment described with reference to FIG. 16.

Processing executed with the image processing device according to the configuration of the image processing device 350 illustrated in FIG. 17 will be described.

A left image input unit 351 inputs a left image (second viewpoint image). The input left image (second viewpoint image) is input to a left image 2D3D converting unit 352.

In the same way, a right image input unit 355 inputs a right image (third viewpoint image). The input right image (third viewpoint image) is input to a right image 2D3D converting unit 356.

The left image depth estimating unit 352 does not estimate depth from image feature amount of the left image (second viewpoint image) input from the left image input unit 351, and generates, from the left image (second viewpoint image), an image where disparity equivalent to a viewpoint further to the left has been provided (first viewpoint image).

The right image depth estimating unit 356 does not estimate depth from image feature amount of the right image (third viewpoint image) input from the right image input unit 355, and generates, from the right image (third viewpoint image), an image where disparity equivalent to a viewpoint further to the right has been provided (fourth viewpoint image).

The new viewpoint image generating processing at these 2D3D converting units may be executed as processing the same as the processing with the first embodiment and second embodiment described earlier with reference to FIG. 5 through FIG. 12, and FIG. 14 through FIG. 15.

The first viewpoint image which the left image 2D3D converting unit 352 has generated is output via a first viewpoint image output unit 353.

The left image which the left image input unit 351 has input, i.e., the second viewpoint image, is output via a second viewpoint image output unit 354.

The right image which the right image input unit 355 has input, i.e., the third viewpoint image, is output via a third viewpoint image output unit 357.

The fourth viewpoint image which the right image 2D3D converting unit 356 has generated is output via a fourth viewpoint image output unit 358.

The output destination is a display device or a storage device or output as communication data as via a network.

With regard to these four different viewpoint images, in the same way as with the embodiments described earlier, by appropriately selecting combination of images in accordance with the position of the user with a naked-eye compatible 3D display device, 3D image presentation is enabled where occurrence of pseudoscopy or crosstalk is suppressed.

With the present embodiment, circuits performing depth detection or estimation can be omitted.

[6. About Fifth Embodiment of Image Processing Device]

Figure 18:
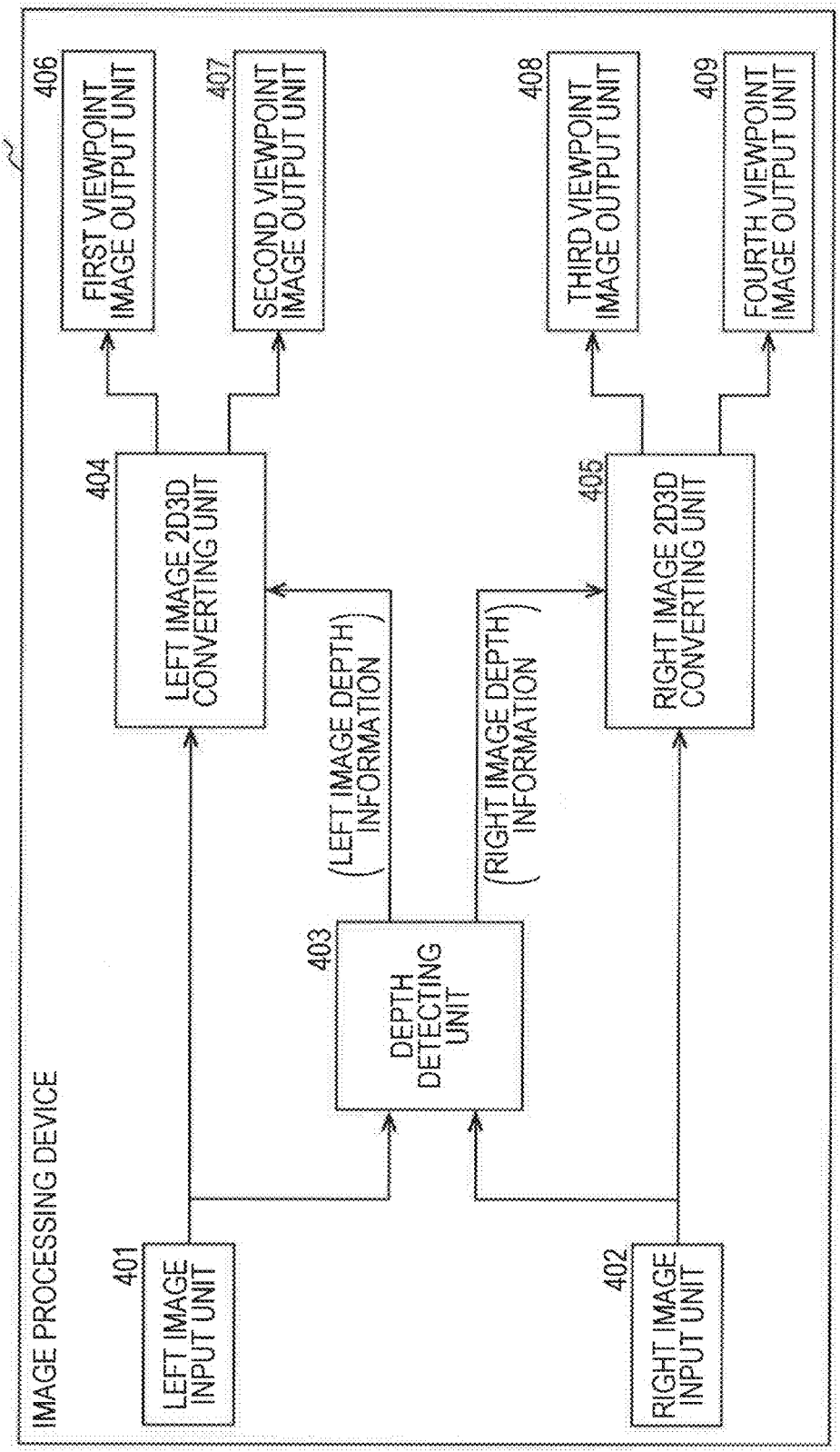
FIG. 18 is a diagram for describing a configuration example of an image processing device according to a fifth embodiment of the present disclosure.

FIG. 18 is a configuration diagram of a fifth embodiment of the image processing device according to the present disclosure.

As with the first embodiment, the fifth embodiment is a device which takes two different viewpoints left and right (left image, right image) as input, and performs multi-viewpoint image generating where images of four viewpoints of a first through a fourth are output.

Unlike the above-described first through fourth embodiments, the fifth embodiment does not use input image itself as output images, and generates first through fourth viewpoint images which are all new output images, based on input images.

With the present embodiment, a shot image from an intermediate position between the viewpoint 1, 103 and the left camera 101 is input as a left image, and a shot image from an intermediate position between the right camera 102 and the viewpoint 4, 104 is input as a right image, in the configuration illustrated in FIG. 3, for example. Based on these input images, the first through fourth viewpoint images illustrated in FIG. 3 are generated as new viewpoint images. This is equivalent to a configuration which performs such processing.

Processing executed with the image processing device according to the configuration of the image processing device 400 illustrated in FIG. 18 will be described.

A left image input unit 401 inputs a left image. The input left image is input to a depth detecting unit 403 and a left image 2D3D converting unit 404.

In the same way, a right image input unit 402 inputs a right image. The input right image is input to the depth detecting unit 403 and a right image 2D3D converting unit 405.

The depth detecting unit 403 detects which of the pixels or blocks in the right image that each pixel or each block in the left image corresponds to, and left image depth information where the difference in position is saved at a position corresponding to that pixel in the left image, and detects which of the pixels or blocks in the left image that the pixels or blocks in the right image correspond to, and generates right image depth information where the difference in position is saved at a position corresponding to that pixel in the right image.

A left image 2D3D converting unit 404 inputs the left image input from the left image input unit 401, and left image depth information (e.g., distance image) generated at the depth detecting unit 403, and uses these information to generate the two images of an image from a viewpoint further to the left side of the input left image (first viewpoint image), and an image equivalent to a shot image from a viewpoint to the right side of the input left image (second viewpoint image).

In the same way, a right image 2D3D converting unit 405 inputs the right image input from the right image input unit 402, and right image depth information (e.g., distance image) generated at the depth detecting unit 403, and uses these information to generate the two images of an image from a viewpoint to the left side of the input right image (third viewpoint image), and an image from a viewpoint further to the right side of the input right image (fourth viewpoint image).

The new viewpoint image generating processing at these 2D3D converting units may be executed as processing the same as the processing with the first embodiment and second embodiment described earlier with reference to FIG. 5 through FIG. 12, and FIG. 14 through FIG. 15.

The first viewpoint image which the left image 2D3D converting unit 404 has generated is output via a first viewpoint image output unit 406.

The second viewpoint image which the left image 2D3D converting unit 404 has generated is output via a second viewpoint image output unit 407.

The third viewpoint image which the right image 2D3D converting unit 405 has generated is output via a third viewpoint image output unit 408.

The fourth viewpoint image which the right image 2D3D converting unit 405 has generated is output via a fourth viewpoint image output unit 409.

Note that the output destination of the images is, for example, a device executing display processing of 3D image display, or a storage device recording 3D image data, or the like. Alternatively, this may be output as communication data as to a device connected via a network.

With regard to these four different viewpoint images, in the same way as with the first embodiment described earlier, at the time of executing 3D image display at a display device for example, two images are appropriately selected in accordance with the observation position of the user, and output as a left eye image and right eye image. That is to say, by appropriately selecting combination of images in accordance with the position of the user with a naked-eye compatible 3D display device, 3D image presentation is enabled where occurrence of pseudoscopy or crosstalk is suppressed.

[7. About Sixth Embodiment of Image Processing Device]

Figure 19:
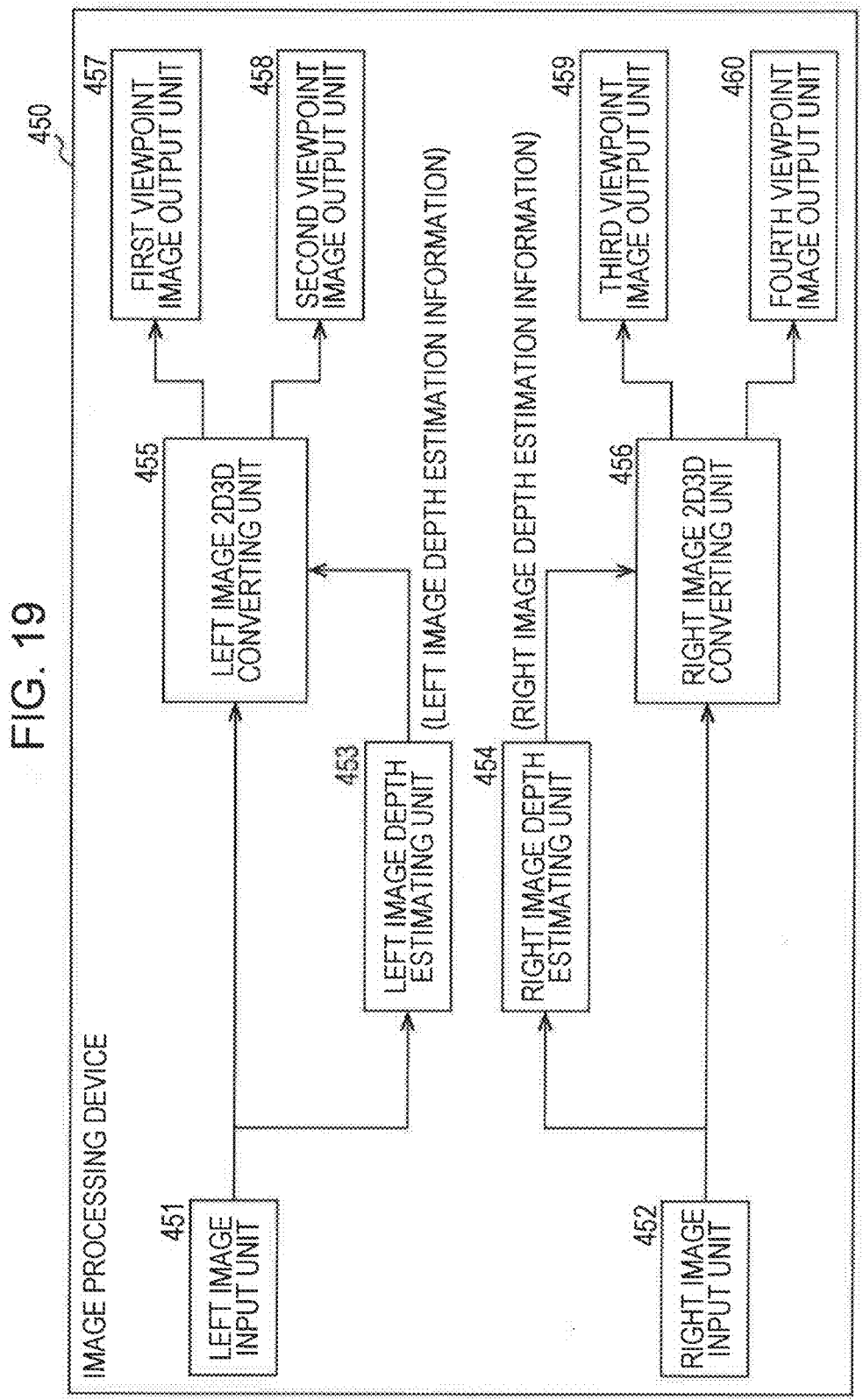
FIG. 19 is a diagram for describing a configuration example of an image processing device according to a sixth embodiment of the present disclosure.

FIG. 19 is a configuration diagram of a sixth embodiment of the image processing device according to the present disclosure.

As with the first embodiment, the sixth embodiment is a device which takes two different viewpoints left and right (left image, right image) as input, and performs multi-viewpoint image generating where images of four viewpoints of a first through a fourth are output.

The sixth embodiment has a depth estimating unit the same as with that of the third embodiment described with reference to FIG. 16.

In the same way as with the fifth embodiment described with reference to FIG. 18, the sixth embodiment does not use input images themselves as output images, and generates first through fourth viewpoint images which are all new output images, based on input images.

For example, a shot image from an intermediate position between the viewpoint 1, 103 and the left camera 101 is input as a left image, and a shot image from an intermediate position between the right camera 102 and the viewpoint 4, 104 is input as a right image, in the configuration illustrated in FIG. 3, for example. Based on these input images, the new first through fourth viewpoint images are generated. This is equivalent to a configuration which performs such processing.

Processing executed with the image processing device according to the configuration of the image processing device 450 illustrated in FIG. 19 will be described.

A left image input unit 451 inputs a left image. The input left image is input to a depth detecting unit 453 and a left image 2D3D converting unit 455.

In the same way, a right image input unit 452 inputs a right image. The input right image is input to a depth detecting unit 454 and a right image 2D3D converting unit 456.

The left image 2D3D converting unit 455 inputs the left image input from the left image input unit 451, and left image depth information generated at the depth detecting unit 453, and uses these information to generate the two images of an image from a viewpoint further to the left side of the input left image (first viewpoint image), and an image equivalent to a shot image from a viewpoint to the right side of the input left image (second viewpoint image).

The right image 2D3D converting unit 456 inputs the right image input from the right image input unit 452, and right image depth information generated at the depth detecting unit 454, and uses these information to generate the two images of an image from a viewpoint to the left side of the input right image (third viewpoint image), and an image from a viewpoint further to the right side of the input right image (fourth viewpoint image).

The new viewpoint image generating processing at these 2D3D converting units may be executed as processing the same as the processing with the first embodiment and second embodiment described earlier with reference to FIG. 5 through FIG. 12, and FIG. 14 through FIG. 15.

The first viewpoint image which the left image 2D3D converting unit 455 has generated is output via a first viewpoint image output unit 457.

The second viewpoint image which the left image 2D3D converting unit 455 has generated is output via a second viewpoint image output unit 458.

The third viewpoint image which the right image 2D3D converting unit 456 has generated is output via a third viewpoint image output unit 459.

The fourth viewpoint image which the right image 2D3D converting unit 456 has generated is output via a fourth viewpoint image output unit 460.

Note that the output destination of the images is, for example, a device executing display processing of 3D image display, or a storage device recording 3D image data, or the like. Alternatively, this may be output as communication data as to a device connected via a network.

With regard to these four different viewpoint images, in the same way as with the first embodiment described earlier, at the time of executing 3D image display at a display device for example, two images are appropriately selected in accordance with the observation position of the user, and output as a left eye image and right eye image. That is to say, by appropriately selecting combination of images in accordance with the position of the user with a naked-eye compatible 3D display device, 3D image presentation is enabled where occurrence of pseudoscopy or crosstalk is suppressed.

[8. About Seventh Embodiment of Image Processing Device]

Figure 20:
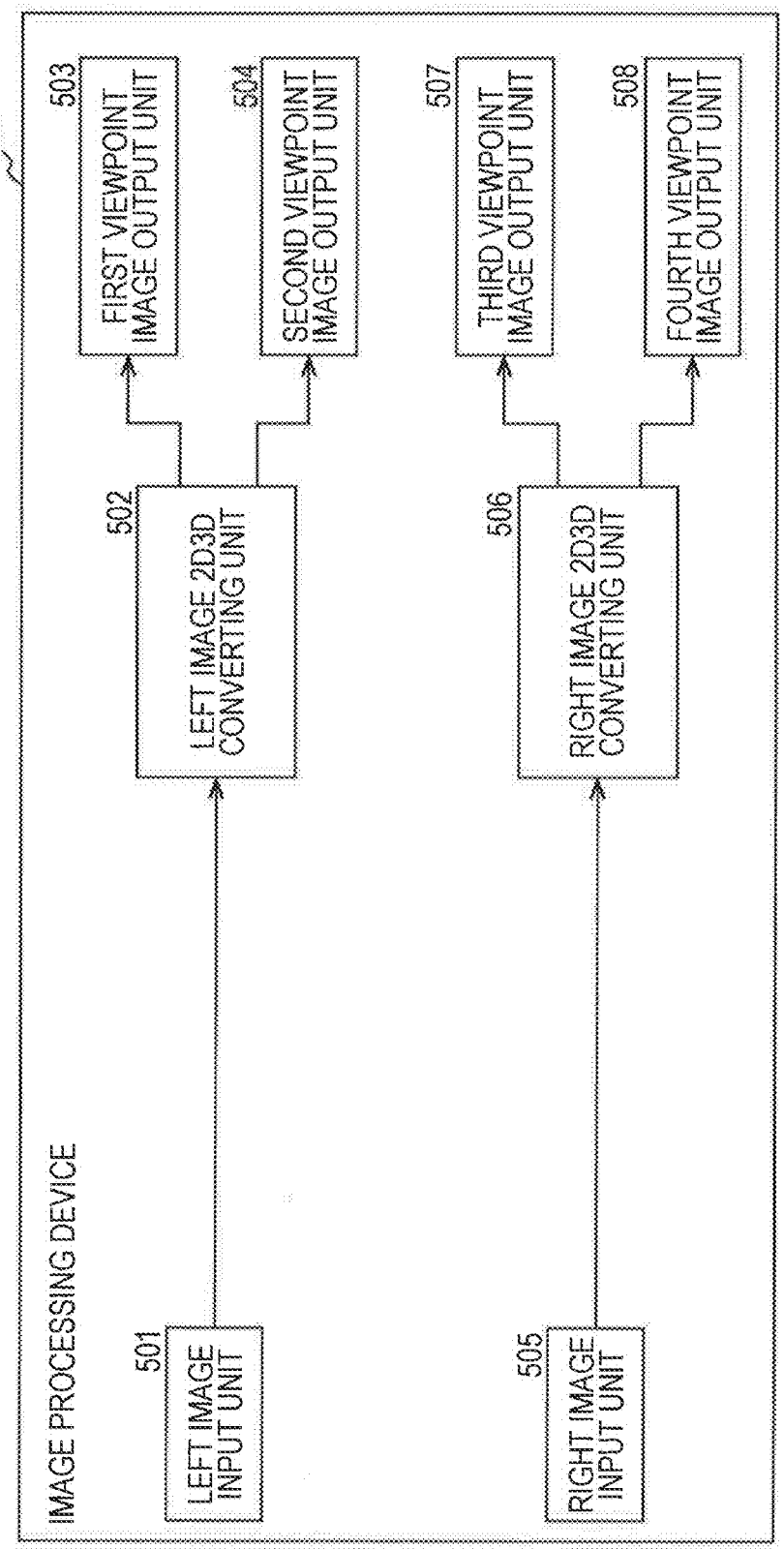
FIG. 20 is a diagram for describing a configuration example of an image processing device according to a seventh embodiment of the present disclosure.

FIG. 20 is a configuration diagram of a seventh embodiment of the image processing device according to the present disclosure.

As with the first embodiment, the seventh embodiment is a device which takes two different viewpoints left and right (left image, right image) as input, and performs multi-viewpoint image generating where images of four viewpoints of a first through a fourth are output.

The seventh embodiment has a configuration which has neither a depth detecting unit nor a depth estimating unit in the same way as with the fourth embodiment described with reference to FIG. 17.

Also, in the same way as with the fifth embodiment described with reference to FIG. 18, input images themselves are not used as output images, and first through fourth viewpoint images which are all new output images are generated, based on input images.

For example, a shot image from an intermediate position between the viewpoint 1, 103 and the left camera 101 is input as a left image, and a shot image from an intermediate position between the right camera 102 and the viewpoint 4, 104 is input as a right image, in the configuration illustrated in FIG. 3, for example. Based on these input images, the new first through fourth viewpoint images are generated. This is equivalent to a configuration which performs such processing.

Processing executed with the image processing device according to the configuration of the image processing device 500 illustrated in FIG. 20 will be described.

A left image input unit 501 inputs a left image. The input left image is input to a left image 2D3D converting unit 505.

In the same way, a right image input unit 502 inputs a right image. The input right image is input to a right image 2D3D converting unit 506.

The left image 2D3D converting unit 502 does not estimate depth from image feature amount and so forth of the left image input from the left image input unit 501, and generates, from the left image, the two images of an image from a viewpoint further to the left side of the input left image (first viewpoint image), and an image equivalent to a shot image from a viewpoint to the right side of the input left image (second view point image).

The right image 2D3D converting unit 506 does not estimate depth from image feature amount and so forth of the right image input from the right image input unit 505, and generates the two images of an image from a viewpoint to the left side of the input right image (third viewpoint image), and an image from a viewpoint further to the right side of the input right image (fourth viewpoint image).

The new viewpoint image generating processing at these 2D3D converting units may be executed as processing the same as the processing with the first embodiment and second embodiment described earlier with reference to FIG. 5 through FIG. 12, and FIG. 14 through FIG. 15.

The first viewpoint image which the left image 2D3D converting unit 502 has generated is output via a first viewpoint image output unit 503.

The second viewpoint image which the left image 2D3D converting unit 502 has generated is output via a second viewpoint image output unit 504.

The third viewpoint image which the right image 2D3D converting unit 506 has generated is output via a third viewpoint image output unit 507.

The fourth viewpoint image which the right image 2D3D converting unit 506 has generated is output via a fourth viewpoint image output unit 508.

Note that the output destination of the images is, for example, a device executing display processing of 3D image display, or a storage device recording 3D image data, or the like. Alternatively, this may be output as communication data as to a device connected via a network.

With regard to these four different viewpoint images, in the same way as with the first embodiment described earlier, at the time of executing 3D image display at a display device for example, two images are appropriately selected in accordance with the observation position of the user, and output as a left eye image and right eye image. That is to say, by appropriately selecting combination of images in accordance with the position of the user with a naked-eye compatible 3D display device, 3D image presentation is enabled where occurrence of pseudoscopy or crosstalk is suppressed.

[9. About Eighth Embodiment of Image Processing Device]

Figure 21:
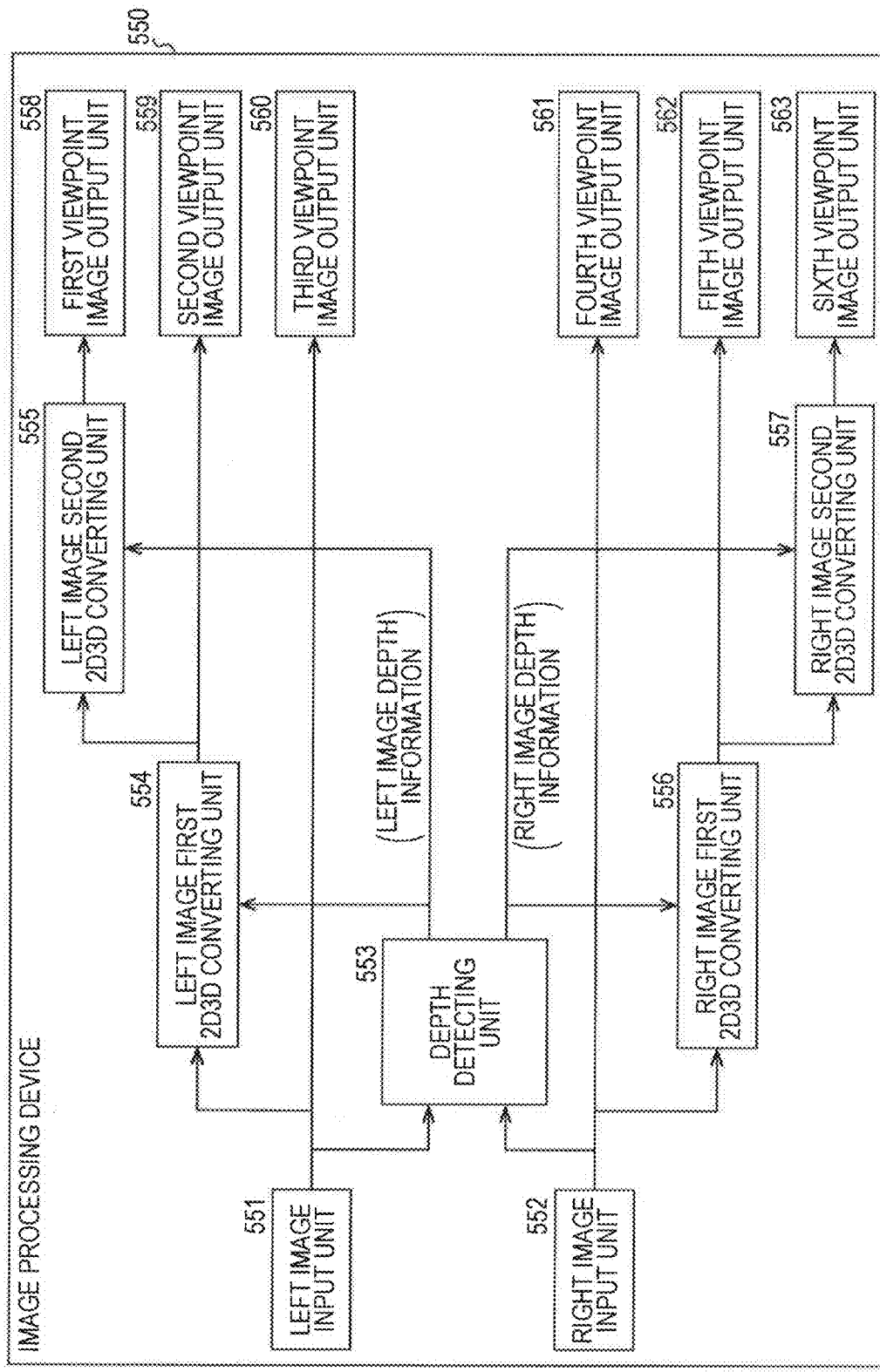
FIG. 21 is a diagram for describing a configuration example of an image processing device according to an eighth embodiment of the present disclosure.

FIG. 21 is a configuration diagram of an eighth embodiment of the image processing device according to the present disclosure.

With the embodiments described so far, description has been made regarding processing examples where two different viewpoints left and right (left image, right image) are taken as input, and multi-viewpoint image generating is performed where images of four viewpoints of a first through a fourth are output.

The image processing device 550 according to the eighth embodiment illustrated in FIG. 21 takes two different viewpoints left and right (left image, right image) as input, and performs multi-viewpoint image generating where images of a greater number, that is six viewpoints of a first through a sixth are output.

Note that each of the images of the first through sixth six viewpoints generated is an image of a viewpoint with the leftmost viewpoint image as the first viewpoint image and moving to the right in order of second, third, and so forth, with the image of the viewpoint farthest to the right being the sixth viewpoint image.

The image processing device 550 according to the eight embodiment illustrated in FIG. 21 outputs the input left image as it is as a third viewpoint image, and based on the input left image (third viewpoint image), generates and outputs a second viewpoint image from a viewpoint to the left side of the input left image, and a first viewpoint further to the left side.

Also, the input right image is output as it is as a fourth viewpoint image, and based on the input right image (fourth viewpoint image), generates and outputs a fifth viewpoint image from a viewpoint to the right side of the input right image, and a sixth viewpoint further to the right side.

Processing executed with this image processing device according to the configuration of the image processing device 550 illustrated in FIG. 21 will be described.

A left image input unit 551 inputs a left image. The input left image is input to a depth detecting unit 553 and a left image first 2D3D converting unit 554.

In the same way, a right image input unit 552 inputs a right image. The input right image is input to the depth detecting unit 553 and a right image first 2D3D converting unit 556.

The depth detecting unit 553 detects which of the pixels or blocks in the right image that the pixels or blocks in the left image correspond to, and left image depth information where the difference in position is saved at a position corresponding to that pixel in the left image, and detects which of the pixels or blocks in the left image that the pixels or blocks in the right image correspond to, and generates right image depth information where the difference in position is saved at a position corresponding to that pixel in the right image.

The left image first 2D3D converting unit 554 inputs the left image (third viewpoint image) input from the left image input unit 551 and the left image depth information (e.g., a distance image) generated at the depth detecting unit 553, and using this information, generates an image (second viewpoint image) from a viewpoint further to the left side from the input left image. The generated second viewpoint image is output via a second viewpoint image output unit 559, and is also provided to a left image second 2D3D converting unit 555.

The left image second 2D3D converting unit 555 inputs the second viewpoint image input from the left image first 2D3D converting unit 554 and the left image depth information (e.g., a distance image) generated at the depth detecting unit 553, and using this information, generates an image (first viewpoint image) from a viewpoint further to the left side from the input second viewpoint image. The generated first viewpoint image is output via a first viewpoint image output unit 558.

The right image first 2D3D converting unit 556 inputs the right image (fourth viewpoint image) input from the right image input unit 552 and the right image depth information (e.g., a distance image) generated at the depth detecting unit 553, and using this information, generates an image (fifth viewpoint image) from a viewpoint further to the right side from the input right image. The generated fifth viewpoint image is output via a fifth viewpoint image output unit 562, and is also provided to a right image second 2D3D converting unit 557.

The right image second 2D3D converting unit 557 inputs the fifth viewpoint image input from the right image first 2D3D converting unit 556 and the right image depth information (e.g., a distance image) generated at the depth detecting unit 553, and using this information, generates an image (sixth viewpoint image) from a viewpoint further to the right side from the input fifth viewpoint image. The generated sixth viewpoint image is output via a first viewpoint image output unit 563.

The new viewpoint image generating processing at these 2D3D converting units may be executed as processing the same as the processing with the first embodiment and second embodiment described earlier with reference to FIG. 5 through FIG. 12, and FIG. 14 through FIG. 15.

The first viewpoint image which the left image second 2D3D converting unit 555 has generated is output via a first viewpoint image output unit 558.

The second viewpoint image which the left image first 2D3D converting unit 554 has generated is output via a second viewpoint image output unit 559.

The image which the left image input unit 551 has input (third viewpoint image) is output via a third viewpoint image output unit 560.

The image which the right image input unit 552 has input (fourth viewpoint image) is output via a fourth viewpoint image output unit 561.

The fifth viewpoint image which the right image first 2D3D converting unit 556 has generated is output via a fifth viewpoint image output unit 562.

The sixth viewpoint image which the right image second 2D3D converting unit 557 has generated is output via a sixth viewpoint image output unit 563.

Note that the output destination of the images is, for example, a device executing display processing of 3D image display, or a storage device recording 3D image data, or the like. Alternatively, this may be output as communication data as to a device connected via a network.

With regard to these six different viewpoint images, in the same way as with the first embodiment described earlier, at the time of executing 3D image display at a display device for example, two images are appropriately selected in accordance with the observation position of the user, and output as a left eye image and right eye image. That is to say, 3D image presentation is enabled where occurrence of pseudoscopy or crosstalk, where the right eye image enters the left eye and the left eye image enters the right eye, or the right eye image and left eye image become mixed, is suppressed.

With the present embodiment, a greater number of multi-viewpoint images than the four viewpoint images described with the first through seventh embodiments can be generated. As illustrated in FIG. 21, by serially connecting 2D3D converting units, the number of viewpoints generated can be increased. Note that the 2D3D conversion processing is not restricted to two stages, and can be connected in multiple stages.

[10. About Ninth Embodiment of Image Processing Device]

Figure 22:
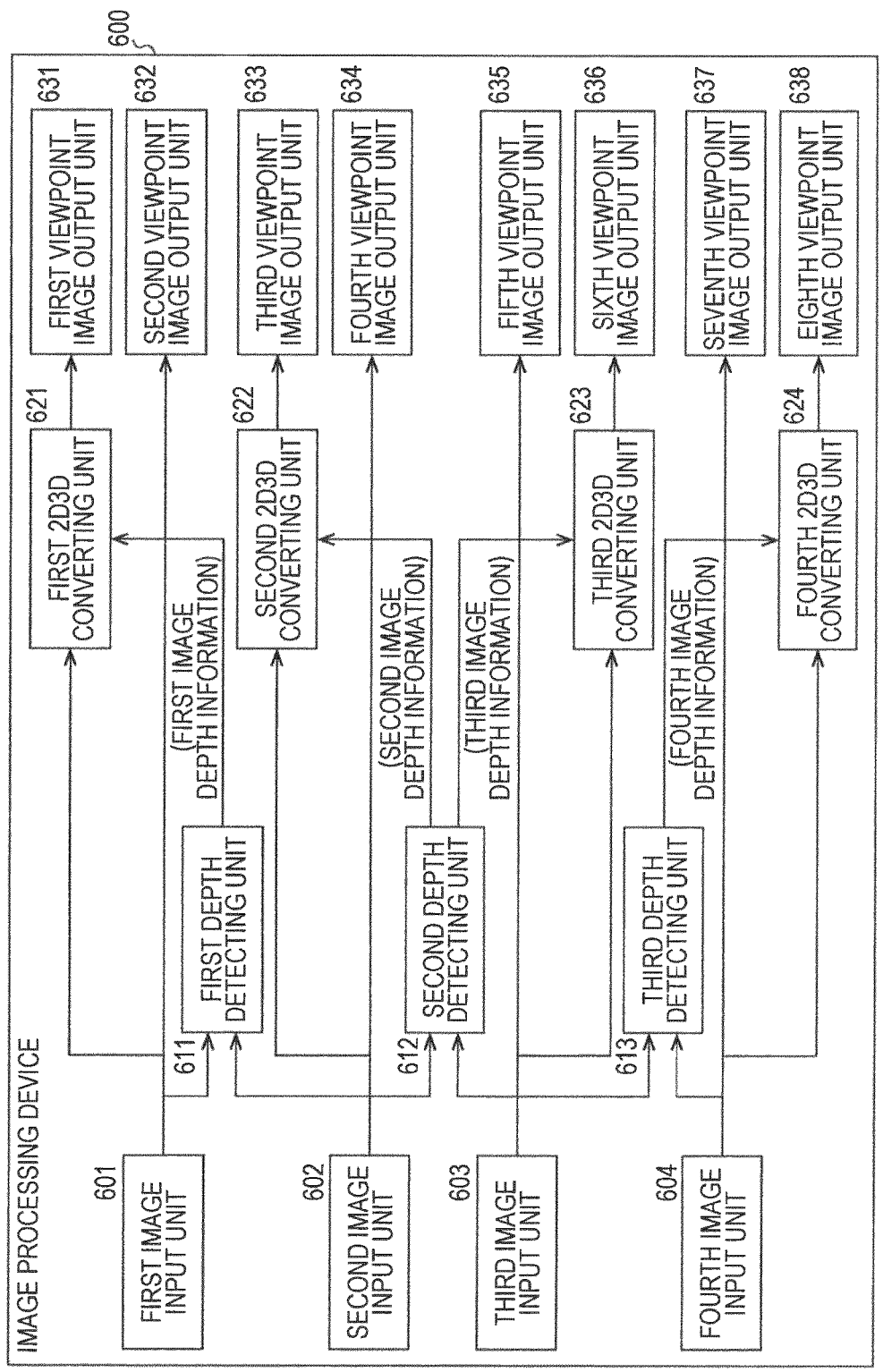
FIG. 22 is a diagram for describing a configuration example of an image processing device according to a ninth embodiment of the present disclosure.

FIG. 22 is a configuration diagram of a ninth embodiment of the image processing device according to the present disclosure.

The image processing device 600 according to the ninth embodiment illustrated in FIG. 22 takes four different viewpoint images (first image through fourth image) as input, and performs multi-viewpoint image generating where eighth viewpoints of a first through an eighth are output.

Note that each of the images of the first through eighth eight viewpoints generated is an image of a viewpoint with the leftmost viewpoint image as the first viewpoint image and moving to the right in order of second, third, and so forth, with the image of the viewpoint farthest to the right being the eighth viewpoint image.

The image processing device 600 according to the ninth embodiment illustrated in FIG. 22 outputs the first image of the input images as it is as a second viewpoint image, and based on the input first image (second viewpoint image), generates and outputs a first viewpoint image from a viewpoint to the left side of the input first image (second viewpoint image).

Also, the second image of the input images is output as it is as a fourth viewpoint image, and based on the input second image (fourth viewpoint image), a third viewpoint image is generated and output from a viewpoint to the left side of the input second image (fourth viewpoint image).

Also, the third image of the input images is output as it is as a fifth viewpoint image, and based on the input third image (fifth viewpoint image), a sixth viewpoint image is generated and output from a viewpoint to the right side of the input third image (fifth viewpoint image).

Also, the fourth image of the input images is output as it is as a seventh viewpoint image, and based on the input fourth image (seventh viewpoint image), an eighth viewpoint image is generated and output from a viewpoint to the right side of the input fourth image (seventh viewpoint image).

Processing executed with this image processing device according to the configuration of the image processing device 600 illustrated in FIG. 22 will be described.

A first image input unit 601 inputs the first image. The input first image is input to a first depth detecting unit 611 and a first 2D3D converting unit 621.

A second image input unit 602 inputs the second image. The input second image is input to the first depth detecting unit 611, a second depth detecting unit 612 and further a second 2D3D converting unit 622.

A third image input unit 603 inputs the third image. The input third image is input to the second depth detecting unit 612, a third depth detecting unit 613 and further a third 2D3D converting unit 623.

A fourth image input unit 604 inputs the fourth image. The input fourth image is input to the third depth detecting unit 613, and further a fourth 2D3D converting unit 624.

The first depth detecting unit 611 detects which of the pixels or blocks in the second image that the pixels or blocks in the first image correspond to, and generates first image depth information where the difference in position is saved at a position corresponding to that pixel in the first image.

The second depth detecting unit 612 detects which of the pixels or blocks in the third image that the pixels or blocks in the second image correspond to, and generates second image depth information where the difference in position is saved at a position corresponding to that pixel in the second image.

Further, which of the pixels or blocks in the second image that the pixels or blocks in the third image correspond to is detected, and third image depth information is generated where the difference in position is saved at a position corresponding to that pixel in third second image.

The third depth detecting unit 613 detects which of the pixels or blocks in the third image that the pixels or blocks in the fourth image correspond to, and generates fourth image depth information where the difference in position is saved at a position corresponding to that pixel in the fourth image.

The first 2D3D converting unit 621 inputs the first image (second viewpoint image) input from the first image input unit 601 and the first image depth information (e.g., a distance image) generated at the first depth detecting unit 611, and using this information, generates an image (first viewpoint image) from a viewpoint further to the left side from the input first image (second viewpoint image).

The second 2D3D converting unit 622 inputs the second image (fourth viewpoint image) input from the second image input unit 602 and the second image depth information (e.g., a distance image) generated at the second depth detecting unit 612, and using this information, generates an image (third viewpoint image) from a viewpoint, further to the left side from the input second image (fourth viewpoint image).

The third 2D3D converting unit 623 inputs the third image (fifth viewpoint image) input from the third image input unit 603 and the third image depth information (e.g., a distance image) generated at the second depth detecting unit 612, and using this information, generates an image (sixth viewpoint image) from a viewpoint further to the right side from the input third image (fifth viewpoint image).

The fourth 2D3D converting unit 624 inputs the fourth image (seventh viewpoint image) input from the fourth image input unit 604 and the fourth image depth information (e.g., a distance image) generated at the third depth detecting unit 613, and using this information, generates an image (eighth viewpoint image) from a viewpoint further to the right side from the input fourth image (seventh viewpoint image).

The new viewpoint image generating processing at these 2D3D converting units may be executed as processing the same as the processing with the first embodiment and second embodiment described earlier with reference to FIG. 5 through FIG. 12, and FIG. 14 through FIG. 15.

The first viewpoint image which the first 2D3D converting unit 621 has generated is output via a first viewpoint image output unit 631.

The image which the first image input unit 601 has input (second viewpoint image) is output via a second viewpoint image output unit 632.

The second viewpoint image which the third 2D3D converting unit 622 has generated is output via a third viewpoint image output unit 633.

The image which the second image input unit 602 has input (fourth viewpoint image) is output via a fourth viewpoint image output unit 634.

The image which the third image input unit 603 has input (fifth viewpoint image) is output via a fifth viewpoint image output unit 635.

The sixth viewpoint image which the third 2D3D converting unit 623 has generated is output via a sixth viewpoint image output unit 636.

The image which the fourth image input unit 604 has input (seventh viewpoint image) is output via a seventh viewpoint image output unit 637.

The eighth viewpoint image which the fourth 2D3D converting unit 624 has generated is output via an eighth viewpoint image output unit 638.

Note that the output destination of the images is, for example, a device executing display processing of 3D image display, or a storage device recording 3D image data, or the like. Alternatively, this may be output as communication data as to a device connected via a network.

With regard to these eight different viewpoint images, in the same way as with the first embodiment described earlier, at the time of executing 3D image display at a display device for example, two images are appropriately selected in accordance with the observation position of the user, and output as a left eye image and right eye image. That is to say, 3D image presentation is enabled where occurrence of pseudoscopy or crosstalk, where the right eye image enters the left eye and the left eye image enters the right eye, or the right eye image and left eye image become mixed, is suppressed.

With the configuration of the present embodiment, a configuration is realized in which three or more images with three or more different viewpoints are taken as input, and four or more viewpoint images are generated.

[11. Review of Configuration of Present Disclosure]

Embodiments of the present disclosure have been described in detail so far with reference to specific embodiments. However, it is self-evident that one skilled in the art may make modifications and substitutions of the embodiments without departing from the essence of the present disclosure. That is to say, the present invention has been disclosed exemplarily, and should not be interpreted restrictively. To determine the essence of the present disclosure, the section of the Claims should be referenced.

Note that the technology disclosed in the present specification may assume the following configurations.

(1) An image processing device including:

a right image input unit configured to input image signals for the right eye, to be applied to 3-dimensional image display;

a left image input unit configured to input image signals for the left eye, to be applied to 3-dimensional image display;

a right image converting unit configured to generate a converted image where the input image signals for the right eye have been subjected to phase change in the right direction or the left direction, in accordance with features of the image;

a left image converting unit configured to generate a converted image where the input image signals for the left eye have been subjected to phase change in the left direction or the right direction, in accordance with features of the image; and an, image output unit configured to output a generated image of the right image converting unit and a generated image of the left image converting unit as a plurality of new viewpoint images.

(2) The image processing device according to the (1), further including: a depth detecting unit configured to generate image depth information having subject distance information corresponding to image signals from each of the input image signals for the right eye and the input image signals for the left eye; wherein the left image converting unit and right image converting unit generate a converted image where the image signals have been subjected to phase change in the left direction or the right direction, with the image depth information as auxiliary information.

(3) The image processing device according to (1) or (2), further including: a depth estimating unit configured to generate subject distance estimation information to image signals from each of the input image signals for the right eye and the input image signals for the left eye; wherein the left image converting unit and right image converting unit generate a converted image where the image signals have been subjected to phase change in the left direction or the right direction, with the subject depth estimation information as auxiliary information.

(4) The image processing device according to any one of (1) through (3), wherein the left image converting unit and right image converting unit extract a luminance differential signal of an input image signal, sets the luminance differential signal as a feature amount, and generates a converted image by adding or subtracting, to or from the input image signal, the luminance differential signal which is the feature amount, or a nonlinear conversion signal of the luminance differential signal.

(5) The image processing device according to any one of (1) through (4), the left image converting unit or right image converting unit including a multi-stage connecting configuration; wherein a converted image generated by an upstream image converting unit is input to a downstream image converting unit, with processing of subjecting input image signals to phase change being repeatedly executed at each image converting unit, sequentially generating new converted images at each image converting unit.

(6) The image processing device according to any one of (1) through (5), wherein the left image converting unit and right image converting unit calculate an inter-image distance difference between maximum distance and, minimum distance subjects, from depth information calculated or estimated based on input image signals for the right, eye and input image signals for the left eye; and generate a new viewpoint image with inter-image distance difference between the maximum distance and minimum distance subjects, obtained from the new viewpoint image and another image, controlled, in accordance with the inter-image distance difference.

(7) The image processing device according to any one of (1) through (6), wherein the left image converting unit and right image converting unit calculate an inter-image distance difference between maximum distance and minimum distance subjects, from depth information calculated or estimated based on input image signals for the right eye and input image signals for the left eye; and generate a new viewpoint image with the inter-image distance differences between the viewpoint images distributed approximately uniformly, in accordance with the number of viewpoint images to be output ultimately.

Also, the series of processing described in the specification may be realized by being executed by hard ware, or software, or a combined configuration of both. In the event of executing the processing by software, a program recording the processing sequence can be installed in memory within a computer built into dedicated hardware and executed, or the program can be installed in a general-purpose computer capable of various types of processing and executed. For example, the program may be recorded in a recording medium beforehand. Besides installing to a computer from a recording medium, the program may be received via a network such as a LAN (Local Area Network) or Internet or the like and installed in a recording medium such as a built-in hard disk.

Note that the various types of processing described in the specification are not restricted to being executed following the described time-sequence, and may be executed in parallel or individually according to the processing capabilities of the device executing the processing, or according to need. Also, system as used in the present specification is a logical group configuration of multiple devices, and is not restricted to the devices of each configuration being within the same housing.

INDUSTRIAL APPLICABILITY

As described above, according to an embodiment configuration of the present disclosure, an image processing device which generates images from a new viewpoint is realized by simple signal processing. Specifically, for example, input image signals for the right eye, and input image signals for the left eye to be applied to image display are input, and a right image converting unit generates a converted image where the input image signals for the right eye have been subjected to phase change in the right direction or the left direction, in accordance with features of the image. In the same way, a left image converting unit generates a converted image where the input image signals for the left eye have been subjected to phase change in the left direction or the right direction, in accordance with features of the image. The generated image of the right image converting unit and the generated image of the left image converting unit are output as multiple new viewpoint images. A converted image is generated by processing where a luminance differential signal of an input image, or a nonlinear conversion signal of the luminance differential signal is added or subtracted, to or from the input image signal, for example. By these processing, generating of images from various viewpoints is enabled without using high-precision subject distance information.

REFERENCE SIGNS LIST 11 left camera
12 right camera
21 left image
22 right image
31 viewpoint 1 camera
32 viewpoint 2 camera
33 viewpoint 3 camera
34 viewpoint 4 camera
41 viewpoint 1 image
42 viewpoint 2 image
43 viewpoint 3 image
44 viewpoint 4 image
101 left camera
102 right camera
103 viewpoint 1
104 viewpoint 2
111 left image (second viewpoint image)
112 right image (third viewpoint image)
113 first viewpoint image
114 fourth viewpoint image
200 image processing device
201 left image input unit
202 right image input unit
203 depth detecting unit
204 left image 2D3D converting unit
205 right image 2D3D converting unit
206 first viewpoint image output unit
207 second viewpoint image output unit
208 third viewpoint image output unit
209 fourth viewpoint image output unit
211 differentiator
212 gain control unit
213 nonlinear conversion unit
214 image compositing unit
221 gain coefficient calculating unit
222 multiplication processing unit
250 image processing device
251 left image input, unit
252 right image input unit
253 depth detecting unit
254 left image 2D3D converting unit
255 right image 2D3D converting unit
256 first viewpoint image output unit
257 second viewpoint image output unit
258 third viewpoint image output unit
259 fourth viewpoint image output unit
261 depth information adjusting unit
300 image processing device
301 left image input unit
302 right image input unit
303 left image depth estimating unit
304 right image depth estimating unit
305 left image 2D3D converting unit
306 right image 2D3D converting unit
307 first viewpoint image output unit
308 second viewpoint image output unit
309 third viewpoint image output unit
310 fourth viewpoint image output unit
350 image processing device
351 left image input unit
352 left image 2D3D converting unit
353 first viewpoint image output unit
354 second viewpoint image output unit
355 right image input unit
356 right image 2D3D converting unit
357 third viewpoint image output unit
358 fourth viewpoint image output unit
400 image processing device
401 left image input unit
402 right image input unit
403 depth detecting unit
404 left image 2D3D converting unit
405 right image 2D3D converting unit
406 first viewpoint image output unit
407 second viewpoint image output unit
408 third viewpoint image output unit
409 fourth viewpoint image output unit
450 image processing device
451 left image input unit
452 right image input unit
453 left image depth estimating unit
454 right image depth estimating unit
455 left image 2D3D converting unit
456 right image 2D3D converting unit
457 first viewpoint image output unit
458 second viewpoint image output unit
459 third viewpoint image output unit
460 fourth viewpoint image output unit
500 image processing device
501 left image input unit
502 left image 2D3D converting unit
503 first viewpoint image output unit
504 second viewpoint image output unit
505 right image input unit
506 right image 2D3D converting unit
508 third viewpoint image output unit
550 image processing device
551 left image input unit
552 right image input unit
553 depth detecting unit
554 left image first 2D3D converting unit
555 left image second 2D3D converting unit
556 right image first 2D3D converting unit
557 right image second 2D3D converting unit
558 first viewpoint image output unit
559 second viewpoint image output unit
560 third viewpoint image output unit
561 fourth viewpoint image output unit
562 fifth viewpoint image output unit
563 sixth viewpoint image output unit
600 image processing device
601 first image input unit
602 second image input unit
603 third image input unit
604 fourth image input unit
611 first depth detecting unit
612 second depth detecting unit
613 third depth detecting unit
621 first 2D3D converting unit
622 second 2D3D converting unit
623 third 2D3D converting unit 624 fourth 2D3D converting unit
631 first viewpoint image output unit
632 second viewpoint image output unit
633 third viewpoint image output unit
634 fourth viewpoint image output unit
635 fifth viewpoint image output unit
636 sixth viewpoint image output unit
637 seventh viewpoint image output unit
638 eighth viewpoint image output unit

The invention claimed is:

1. An image processing device comprising:
processing circuitry; and
a storage medium storing instructions executed by the processing circuitry so that the processing circuitry is configured to:
generate a second image signal of a second viewpoint based on a first image signal of a first viewpoint, the second viewpoint being different from the first viewpoint;
generate a third image signal of a third viewpoint, the third viewpoint different from the first viewpoint and the second viewpoint, by matching one or more pixels in the first image signal to a corresponding one or more pixels in the second image signal and by generating depth information that indicates a difference in position between the one or more pixels in the first image signal and the corresponding one or more pixels in the second image signal;
form a three dimensional (3D) presentation by selecting a combination of images that includes two of the first image signal, the second image signal and the third image signal based on an observation position of a user with a naked-eye compatible 3D display device, and by positioning the images in the combination of images adjacent to each other;
adjust a gain of each image of the combination of images in the 3D presentation according to the depth information to generate a corrected 3D presentation; and
output the corrected 3D presentation to the user.

2. The image processing device according to claim 1, wherein the processing circuitry is further configured to:
extract a first luminance differential signal of the first image signal;
set the first luminance differential signal as a first feature amount; and
generate the second image signal by:
adding, to the first image signal, the first luminance differential signal or a nonlinear conversion signal of the first luminance differential signal, or
subtracting, from the first image signal the first luminance differential signal or the nonlinear conversion signal of the first luminance differential signal.

3. The image processing device according to claim 1, wherein the processing circuitry is further configured to:
generate a fifth image signal of a fifth viewpoint based on a fourth image signal of a fourth viewpoint, the fifth viewpoint being different from the fourth viewpoint;
generate a sixth image signal of a sixth viewpoint based on the fifth image signal, the sixth viewpoint being different from the fourth viewpoint and the fifth viewpoint; and
the 3D presentation by selecting the combination of images.

4. The image processing device according to claim 3, wherein the processing circuitry is further configured to:
extract a second luminance differential signal of the fourth image signal;
set the second luminance differential signal as a second feature amount; and
generate the fifth image signal by:
adding, to the fourth image signal, the second luminance differential signal or a nonlinear conversion signal of the second luminance differential signal, or
subtracting, from the fourth image signal, the second luminance differential signal or the nonlinear conversion signal of the second luminance differential signal.

5. The image processing device according to claim 3, wherein the processing circuitry is further configured to:
generate image depth information based on the first image signal and the fourth image signal, wherein
the second image signal, the third image signal, the fifth image signal, and the sixth image signal are generated with the image depth information as auxiliary information.

6. The image processing device according to claim 3, wherein the computing device executes the instructions further to:
generate first image depth estimating information based on the first image signal, wherein
the first image signal is generated with the first image depth estimating information as auxiliary information.

7. The image processing device according to claim 3, wherein the processing circuitry is further configured to:
calculate an inter-image distance difference between a maximum distance subject and a minimum distance subject from the depth information; and
generate a new viewpoint image with the inter-image distance difference between the viewpoint images distributed approximately and uniformly, in accordance with a number of viewpoint images to be output.

8. An image processing method to be executed at an image processing device, the image processing method comprising:
receiving an input of a first image signal of a first viewpoint;
generating a second image signal of a second viewpoint based on the first image signal, the second viewpoint being different from the first viewpoint;
generating a third image signal of a third viewpoint, the third viewpoint being different from the first viewpoint and the second viewpoint, by matching one or more pixels in the first image signal to a corresponding one or more pixels in the second image signal and by generating depth information that indicates a difference in position between the one or more pixels in the first image signal and the corresponding one or more pixels in the second image signal;
forming, by processing circuitry of the image processing device, a three dimensional (3D) presentation by selecting a combination of images that includes two of the first image signal, the second image signal and the third image signal based on an observation position of a user with a naked-eye compatible 3D display device, and by positioning the images in the combination of images adjacent to each other;
adjusting a gain, by the processing circuitry, of each image of the combination of images in the 3D presentation according to the depth information to generate a corrected 3D presentation; and
outputting the corrected 3D presentation to the user.

9. A non-transitory computer-readable storage medium storing executable instructions, which, when executed by an image processing device, causes the image processing device to execute image processing comprising:

receiving an input of a first image signal of a first viewpoint;

generating a second image signal of a second viewpoint based on the first image signal, the second viewpoint being different from the first viewpoint;

generating a third image signal of a third viewpoint, the third viewpoint being different from the first viewpoint and the second viewpoint, by matching one or more pixels in the first image signal to a corresponding one or more pixels in the second image signal and by generating depth information that indicates a difference in position between the one or more pixels in the first image signal and the corresponding one or more pixels in the second image signal;

forming a three dimensional (3D) presentation by selecting a combination of images that includes two of the first image signal, the second image signal and the third image signal based on an observation position of a user with a naked-eye compatible 3D display device, and by positioning the images in the combination of images adjacent to each other;

adjusting a gain of each image of the combination of images in the 3D presentation according to the depth information to generate a corrected 3D presentation; and outputting the corrected 3D presentation to the user.

\* \* \* \* \*